(12) United States Patent
Araki et al.

(10) Patent No.: US 12,355,356 B2
(45) Date of Patent: Jul. 8, 2025

(54) BOOST CIRCUIT AND VOLTAGE GENERATION DEVICE

(71) Applicant: Mitsubishi Electric Corporation, Tokyo (JP)

(72) Inventors: Yohei Araki, Tokyo (JP); Fumihito Izawa, Tokyo (JP); Noriyuki Matsubara, Hyogo (JP); Masato Achihara, Hyogo (JP); Yuya Yamashita, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 235 days.

(21) Appl. No.: 18/042,417

(22) PCT Filed: Sep. 14, 2021

(86) PCT No.: PCT/JP2021/033686
§ 371 (c)(1),
(2) Date: Feb. 21, 2023

(87) PCT Pub. No.: WO2022/065130
PCT Pub. Date: Mar. 31, 2022

(65) Prior Publication Data
US 2023/0327559 A1 Oct. 12, 2023

(30) Foreign Application Priority Data
Sep. 23, 2020 (JP) .................................. 2020-158495

(51) Int. Cl.
*H02M 3/158* (2006.01)
*H02M 1/42* (2007.01)
*H02M 7/10* (2006.01)

(52) U.S. Cl.
CPC ....... *H02M 3/1582* (2013.01); *H02M 1/4225* (2013.01); *H02M 7/10* (2013.01)

(58) Field of Classification Search
CPC .... H02M 3/1582; H02M 1/4225; H02M 7/10; H02M 1/0064; H02M 1/0095;
(Continued)

(56) References Cited

U.S. PATENT DOCUMENTS 10,050,550 B2 * 8/2018 Morita ..................... H05G 1/12
2021/0205813 A1 * 7/2021 Iwai .................. B01L 3/502784
(Continued)

FOREIGN PATENT DOCUMENTS

| JP | S49092921 U | 8/1974 |
| JP | 2015002654 A * | 1/2015 |

(Continued)

OTHER PUBLICATIONS

International Search Report (PCT/ISA/210) with English translation and Written Opinion (PCT/ISA/237) mailed on Nov. 22, 2021, by the Japan Patent Office as the International Searching Authority for International Application No. PCT/JP2021/033686.

*Primary Examiner* — Ryan Jager
(74) *Attorney, Agent, or Firm* — BUCHANAN, INGERSOLL & ROONEY PC

(57) ABSTRACT

A boost circuit that boosts a voltage using multiple capacitors and multiple diodes disposed on an insulated substrate, where the insulated substrate is divided into multiple insulated substrates, and at least one of the multiple capacitors or the multiple diodes is disposed between the insulated substrates to cross an insulation layer between the insulated substrates.

20 Claims, 23 Drawing Sheets

(58) Field of Classification Search
CPC ...... H02M 7/003; H02M 7/103; H02M 3/077; H02M 3/28
USPC ........................................................ 315/291
See application file for complete search history.

(56) References Cited

U.S. PATENT DOCUMENTS

2021/0271037 A1* 9/2021 Brusberg ............. G02B 6/4274
2023/0327559 A1* 10/2023 Araki .................. H02M 3/1582
                                                               315/291

FOREIGN PATENT DOCUMENTS

JP          7391314 B2 * 12/2023
WO       2015005380 A1    1/2015

* cited by examiner

BOOST CIRCUIT AND VOLTAGE GENERATION DEVICE

FIELD

The present disclosure relates to a boost circuit for boosting a voltage and a voltage generation device.

BACKGROUND

A voltage generation device for use in acceleration of an electron beam by an electron gun, an ion beam generator, an electron microscope, or the like includes a Cockcroft-Walton circuit (hereinafter referred to as CW circuit) as a circuit that converts an alternating current (AC) voltage into a direct current (DC) voltage. This voltage generation device includes multiple insulated substrates each including a boost circuit, stacked one on top of another, to gradually boost the voltage in each boost circuit thus to generate a high voltage.

Each boost circuit in a voltage generation device includes components having poor voltage resistance, but the voltage increases as the voltage outputting port is approached. This results in a large potential difference between a low-voltage portion and a high-voltage portion, thereby allowing a discharge to more easily occur between terminals or between a high voltage portion and a surrounding container. A sufficient dielectric strength is required to prevent occurrence of such discharge, but a large dielectric strength will result in an increase in size of the voltage generation device.

The CW circuit included in the voltage generation device described in Patent Literature 1 includes capacitors that are connected in series, each having end electrodes at both ends on the substrate. A diode is connected at a point of connection between capacitors. In addition, at an end of the substrate, a high-voltage output cable is connected to a component connection portion, which is a connection portion between a capacitor and a diode. The component connection portion is arranged not to protrude from the space formed between one end electrode of the capacitor and the leading end of the high-voltage output cable. This enables the voltage generation device described in Patent Literature 1 to reduce the electric field in the component connection portion, and thus to improve the dielectric strength, thereby preventing occurrence of a discharge, and at the same time, achieving a size reduction.

CITATION LIST

Patent Literature

Patent Literature 1: WO 2015/005380 A

SUMMARY

Technical Problem

The foregoing technology of Patent Literature 1 does not take into account a creeping discharge on a surface of the substrate serving as the base of components, or on an interface inside the substrate. This results in an insufficient dielectric strength along the creepage direction of the substrate. One countermeasure against a creeping discharge is to increase the electrode spacing by use of a larger-size component. However, use of a larger-size component increases the size of the circuit. A method has accordingly been devised to provide a slit between electrodes on the substrate. For example, in a case in which a slit is provided between two terminals of a diode, the electric field intensity in the air layer in the slit between these terminals depends on the ratio between the air layer width and the dielectric layer (e.g., printed board) width. That is, a smaller air layer width relative to the dielectric layer width results in a higher electric field intensity in the air layer. Accordingly, the slit width is designed such that the electric field value in the air layer in the slit will not exceed the breakdown electric field value of air.

However, the slit end portions, which are the end portions of a slit as viewed from above the substrate, are round. This prevents the slit end portions from having a sufficient air layer width for preventing breakdown as compared to the slit center portion. An insufficient air layer width for preventing breakdown may cause a partial discharge, which causes damage to the insulated substrate or generation of ozone that accelerates degradation of the insulated substrate, thereby presenting a problem of possibility of a short-circuit fault of the circuit.

The present disclosure has been made in view of the foregoing, and it is an object of the present disclosure to provide a boost circuit that provides both increased dielectric strength along the creepage direction and a size reduction.

Solution to Problem

To solve the problem and achieve the object described above, the present disclosure is a boost circuit to boost a voltage using a plurality of capacitors and a plurality of diodes disposed on an insulated substrate, and the insulated substrate is divided into a plurality of substrate units. In the boost circuit of the present disclosure, at least one of the capacitors or the diodes is disposed between the substrate units to cross an insulation layer between the substrate units.

Advantageous Effects of Invention

A boost circuit according to the present disclosure provides an advantage in capability of providing both increased dielectric strength along the creepage direction and a size reduction.

DESCRIPTION OF EMBODIMENTS

Embodiments of a boost circuit and a voltage generation device according to the present disclosure will be described in detail below with reference to the drawings.

First Embodiment

Figure 1:
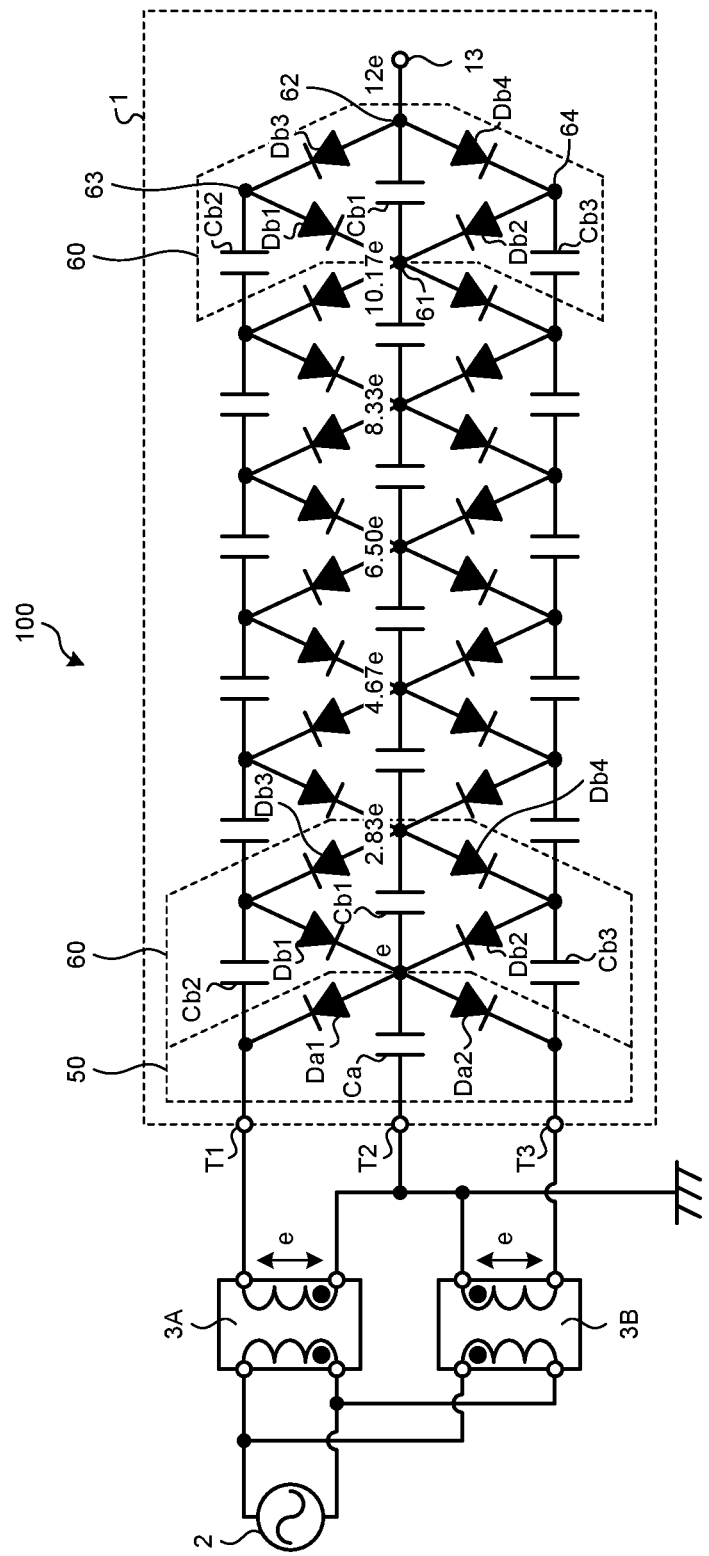
FIG. 1 is a diagram illustrating a configuration of a CW circuit included in a voltage generation device according to a first embodiment.

FIG. 1 is a diagram illustrating a configuration of a CW circuit included in a voltage generation device according to a first embodiment. A voltage generation device 100, which is a direct current (DC) high voltage generation device, includes a CW circuit 1, which is a boost circuit; boosting transformers 3A and 3B; and an inverter circuit 2, which generates an alternating current (AC) voltage. The following description assumes that the CW circuit 1 is a symmetrical inverse CW circuit.

The voltage generation device 100 of the first embodiment includes multiple stages of insulated substrates stacked one on top of another, each having constituent components (each hereinafter referred to as component) such as a capacitor and a diode disposed thereon, thereby forming the CW circuit 1, which generates a high voltage. Each stage of the insulated substrates forming this CW circuit 1 is divided into multiple parts, and components are disposed between the parts generated by the division of each of the insulated substrates to cross a gap between these parts of each of the insulated substrates.

The voltage generation device 100 generates, for example, a DC high voltage from several tens of kilovolts to several hundreds of kilovolts using the CW circuit 1, which is a multi-stage voltage-doubling rectifier circuit. The DC high voltage generated by the voltage generation device 100 is used when, for example, an electron beam machining machine, which performs machining through emission of an electron beam to a target, accelerates an electron beam. The DC high voltage generated by the voltage generation device 100 may be used in an electron gun, an ion beam generator, an electron microscope, and the like.

The components of the CW circuit 1 are each a component having a low voltage resistance. Voltage is boosted in the CW circuit 1, and a high voltage is output from an end output portion 13, which is the output terminal. This means that the voltage applied to the CW circuit 1 increases as the end output portion 13 is approached. Note that the boost method, the boost ratio, the voltage value, and the like of the CW circuit 1 herein described are merely by way of example, and the CW circuit 1 may be a CW circuit that uses any boost method.

The CW circuit 1, of a symmetrical inverse type, is connected to the two boosting transformers 3A and 3B, which are in turn connected to the inverter circuit 2. The inverter circuit 2 is a full-bridge inverter including switching elements such as insulated gate bipolar transistors (IGBTs) or metal-oxide-semiconductor field-effect transistors (MOSFETs). The inverter circuit 2 is driven at a frequency in the order of kHz.

The boosting transformers 3A and 3B boost the output of the inverter circuit 2 to a voltage ranging from minus several kilovolts to minus several tens of kilovolts (e.g., −10 kV). The boosting transformers 3A and 3B each include a primary winding and a secondary winding, and the secondary windings of the respective boosting transformers 3A and 3B are connected in series to each other. The polarity of each of the windings of the boosting transformers 3A and 3B is indicated by a black dot. The secondary windings of the respective boosting transformers 3A and 3B are connected to each other on their black dot sides.

Both terminals of the secondary winding of the boosting transformer 3A respectively correspond to input terminals T1 and T2 of the CW circuit 1. Both terminals of the secondary winding of the boosting transformer 3B respectively correspond to input terminals T2 and T3 of the CW circuit 1. The input terminal T2 is connected to a fixed potential.

A circuit configuration of the CW circuit 1 will next be described. The CW circuit 1 includes multiple diodes and multiple capacitors. Specifically, the CW circuit 1 includes a rectification circuit portion 50 and voltage-doubling boost circuit portions 60. The rectification circuit portion 50 includes a DC capacitor Ca and diodes Da1 and Da2, and each of the voltage-doubling boost circuit portions 60 includes a DC capacitor Cb1, AC capacitors Cb2 and Cb3, and diodes Db1 to Db4.

The CW circuit 1 of a symmetrical inverse type has no first capacitors and no first diodes as viewed from the input side, and the first-stage circuit thus simply forms the rectification circuit portion 50. The rectification circuit portion 50 is connected to the input terminals T1 to T3. The entirety of the voltage-doubling boost circuit portions 60 is connected to the rectification circuit portion 50 and to the end output portion 13. The rectification circuit portion 50 is configured such that the DC capacitor Ca is connected to the input terminal T2, the cathode of the diode Da1 is connected to the input terminal T1, and the cathode of the diode Da2 is connected to the input terminal T3.

The multiple voltage-doubling boost circuit portions 60 are connected in tandem to the rectification circuit portion 50. That is, the multiple voltage-doubling boost circuit portions 60 each including the DC capacitor Cb1, the AC capacitors Cb2 and Cb3, and the diodes Db1 to Db4 are connected in tandem to the DC capacitor Ca and to the diodes Da1 and Da2 included in the rectification circuit portion 50. This configuration causes the CW circuit 1 to serve as a multi-stage voltage-doubling rectifier circuit. The DC capacitor Ca of the rectification circuit portion 50 has a capacitance that is twice the capacitance of the DC capacitor Cb1 included in the voltage-doubling boost circuit portion 60.

A voltage-doubling boost circuit portion 60-N (where N is a natural number) is connected to a voltage-doubling boost circuit portion 60-(N−1), where the voltage-doubling boost circuit portion 60-N represents the N-th voltage-doubling boost circuit portion 60 of the voltage-doubling boost circuit portions 60. A configuration of the voltage-doubling boost circuit portion 60-N will now be described assuming that the voltage-doubling boost circuit portion 60-N is near to the end output portion 13.

In the voltage-doubling boost circuit portion 60-N, which is a unit circuit, the cathode of the diode Db1 and the cathode of the diode Db2 are connected to each other at a junction point 61. In addition, the anode of the diode Db3 and the anode of the diode Db4 are connected to each other at a junction point 62. Moreover, the anode of the diode Db1 and the cathode of the diode Db3 are connected to each other at a junction point 63, and the anode of the diode Db2 and the cathode of the diode Db4 are connected to each other at a junction point 64. The DC capacitor Cb1 is connected to the junction point 61 and to the junction point 62.

The AC capacitor Cb2 of the voltage-doubling boost circuit portion 60-N is connected to the junction point 63 of the voltage-doubling boost circuit portion 60-N and to the junction point 63 of the voltage-doubling boost circuit portion 60-(N−1). The AC capacitor Cb3 of the voltage-doubling boost circuit portion 60-N is connected to the junction point 64 of the voltage-doubling boost circuit portion 60-N and to the junction point 64 of the voltage-doubling boost circuit portion 60-(N−1). The junction point 61 of the voltage-doubling boost circuit portion 60-N is the junction point 62 of the voltage-doubling boost circuit portion 60-(N−1).

The voltage-doubling boost circuit portion 60 in the first stage is connected to the voltage-doubling boost circuit portion 60 in the second stage and to the rectification circuit portion 50. In the voltage-doubling boost circuit portion 60 in the first stage, the AC capacitor Cb2 is connected to the input terminal T1 and to the cathode of the diode Da1, and the AC capacitor Cb3 is connected to the input terminal T3 and to the cathode of the diode Da2. In addition, in the voltage-doubling boost circuit portion 60 in the first stage, the junction point 61 is connected to the DC capacitor Ca.

An operational principle of the CW circuit 1 will next be described. The voltage output by the CW circuit 1 from the end output portion 13 is utilized as, for example, a high voltage for generation of an electron beam. In this respect, the voltage V output from the end output portion 13 is expressed as $V=(2n-1)e$, where e represents the peak value of the output voltage of the boosting transformers 3A and 3B, and n represents the number of the voltage-doubling boost circuit portions 60 connected in series. FIG. 1 illustrates a case in which the total number of the voltage-doubling boost circuit portions 60 connected in series is 6.5, and the CW circuit 1 is therefore a 12-times boost circuit.

Figure 2:
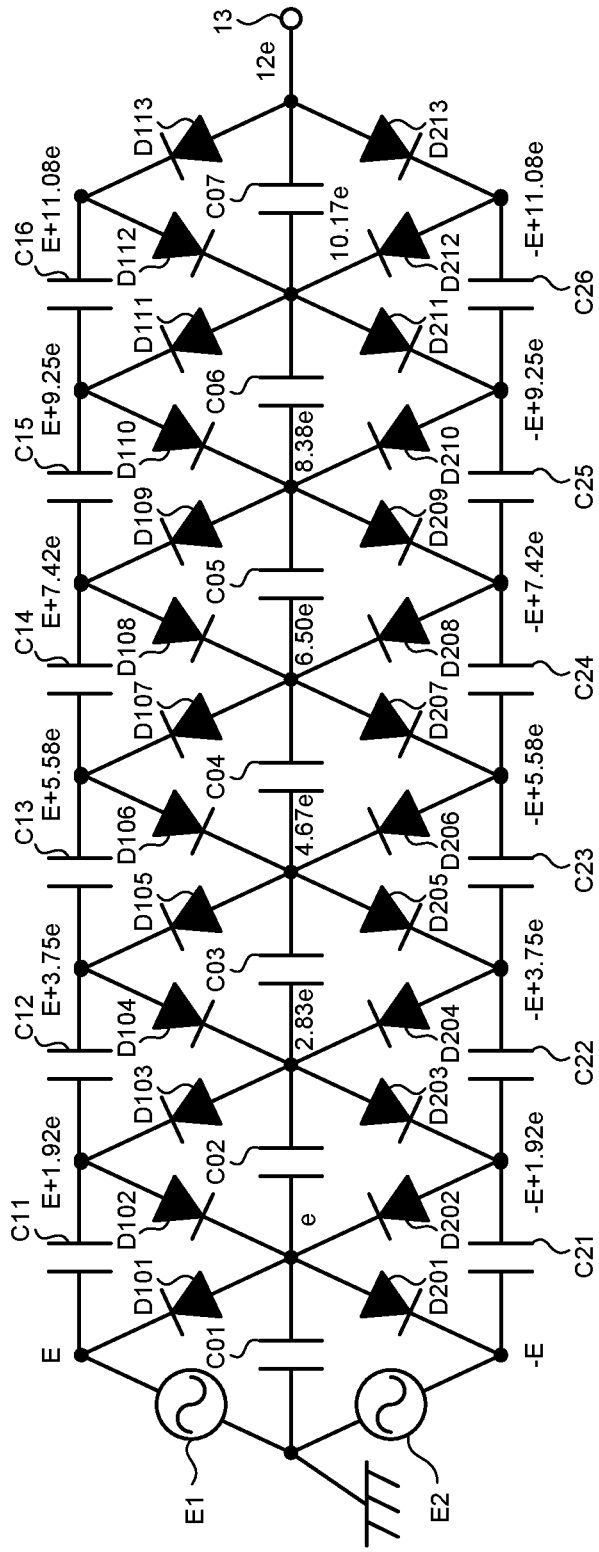
FIG. 2 is a diagram for describing an operational principle of the CW circuit included in the voltage generation device according to the first embodiment.

FIG. 2 is a diagram for describing an operational principle of the CW circuit included in the voltage generation device according to the first embodiment. With reference to FIG. 2, an operation will be described when the total number of the voltage-doubling boost circuit portions 60 connected in series is 6.5. In FIG. 2, the diodes Db1 and Db3 in the CW circuit 1 are designated diodes D102, D103, . . . , D113 sequentially starting from the one nearest to the voltage input, and the diodes Db2 and Db4 in the CW circuit 1 are designated diodes D202, D203, D213 sequentially starting from the one nearest to the voltage input. In addition, the DC capacitors Cb1 in the CW circuit 1 are designated DC capacitors C02, C03, . . . , C07 sequentially starting from the one nearest to the voltage input. Moreover, the AC capacitors Cb2 in the CW circuit 1 are designated AC capacitors C11, C12, . . . , C16 sequentially starting from the one nearest to the voltage input, and the AC capacitors Cb3 in the CW circuit 1 are designated AC capacitors C21, C22, . . . , C26 sequentially starting from the one nearest to the voltage input.

In addition, the diodes Da1 and Da2 of the rectification circuit portion 50 are designated diodes D101 and D201, and the DC capacitor Ca is designated DC capacitor C01. Note that in FIG. 2, a voltage value written next to a junction point of the CW circuit 1 is the voltage value at that junction point.

AC power supplies E1 and E2 respectively generate sinusoidal voltages $E_0$ (=e sin ωt) and $-E_0$ (=−e sin ωt) having the same peak value (=e) and a phase difference of 180 degrees from each other. The peak value e is a negative value.

At the time when the AC power supply E1 generates the maximum voltage e, the DC capacitor C01 is charged to the voltage e through the diode D101. At this time, the AC power supply E2 generates a voltage of −0.92e, and the AC capacitor C21 is therefore charged to 1.92e through the diodes D101 and D202.

Next, when the AC power supply E2 generates the voltage e, the higher voltage terminal of the AC capacitor C21 has a potential of 2.92e. This potential causes the DC capacitors C01 and C02 connected in series to be charged to a voltage of 2.92e through the diode D203. At the same time, the AC capacitors C11 and C12 connected in series are charged to a voltage of 2.83e through the diodes D203 and D104. When the AC power supply E1 again generates the voltage e, the DC capacitors C01, C02, and C03 connected in series in the next stage are charged to 4.67e through the diode D105. Such capacitor charging is repeated in the CW circuit 1, thereby causing the output of the last stage from the end output portion 13 to have a voltage of 12e.

Only the capacitance of the DC capacitor C01 is defined as twice (2C) the capacitance of the other DC capacitors for the purpose of preventing an occurrence of surge. For example, when breakdown of a load causes an abrupt discharge in the DC capacitors C01 to C07, the voltage across each of all of the DC capacitors C01 to C07 becomes e due to the same amount of discharge among the DC capacitors C01 to C07 connected in series, and the voltage of the others becomes 2e. Thus, by defining of only the DC capacitor C01 in the first stage as having a capacitance of 2C, the amounts of charge are all 2eC in normal operation. Accordingly, the DC capacitors C01 to C07 will all have the same terminal voltage of zero even when an abrupt discharge occurs. None of these will fail, and occurrence of a surge voltage is prevented.

Figure 3:
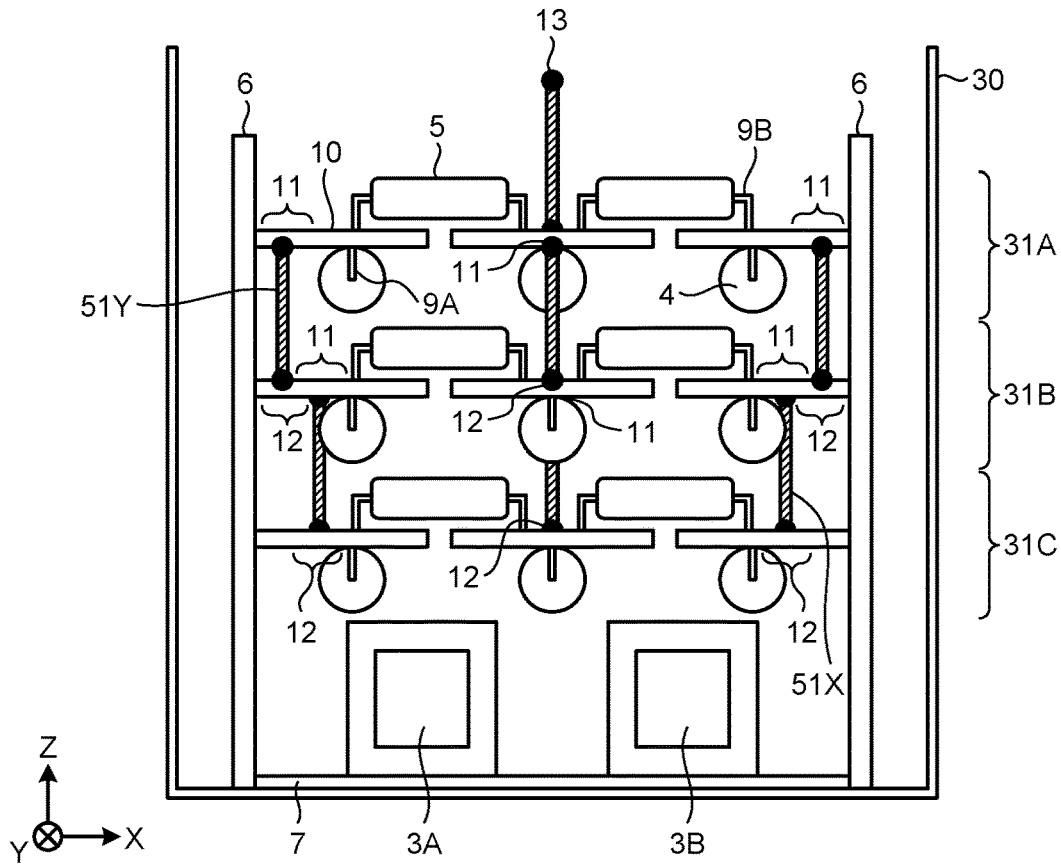
FIG. 3 is a diagram illustrating a mounting configuration of the CW circuit included in the voltage generation device according to the first embodiment.

A mounting configuration of the CW circuit 1 will next be described. FIG. 3 is a diagram illustrating a mounting configuration of the CW circuit included in the voltage generation device according to the first embodiment. FIG. 3 illustrates a cross-sectional view of a surrounding container 30 having a cylindrical shape including the CW circuit 1 disposed therein, taken along a plane including the cylindrical axis.

Note that the following description assumes that the direction toward the bottom of the surrounding container 30 is the downward direction, and the direction toward a stage 31A is the upward direction. The following description also assumes that two axes perpendicular to each other on a plane parallel to the upper surfaces of stages 31A to 31C constituting the CW circuit 1 are X-axis and Y-axis, and that the axis perpendicular to the X-axis and the Y-axis is Z-axis. Thus, the Z-axis direction is the upward-downward direction of the surrounding container 30. In addition, it is also assumed that the Y-axis direction is the front view direction of the stages 31A to 31C, and that the X-axis direction is the side view direction of the stages 31A to 31C. FIG. 3 illustrates a cross-sectional view of the stages 31A to 31C as viewed from the front view direction.

The CW circuit 1 of the voltage generation device 100 is placed inside the surrounding container 30 having a cylindrical shape that is grounded. A bottom plate 7 is provided in a bottom portion of the surrounding container 30. The two boosting transformers 3A and 3B are disposed on the upper surface of the bottom plate 7.

In the surrounding container 30, multiple stages are disposed in a space above the boosting transformers 3A and 3B. FIG. 3 illustrates a case in which the three stages 31A, 31B, and 31C are stacked one on top of another to be equally spaced from each other inside the surrounding container 30. The stage 31C is the first stage from the bottom. The stage 31B is the second stage from the bottom. The stage 31A is the third stage from the bottom.

The stages 31A to 31C and the bottom plate 7 are arranged to have the upper surfaces and the bottom surfaces (lower surfaces) thereof being parallel to one another. FIG. 3 illustrates a case in which the stage 31C is disposed above the bottom plate 7, the stage 31B is disposed over the stage 31C, and the stage 31A is disposed over the stage 31B.

The boosting transformers 3A and 3B are electrically connected to the stage 31C. The stage 31C is electrically connected to the stage 31B via interconnection wires 51X, and the stage 31B is electrically connected to the stage 31A via interconnection wires 51Y. Note that FIG. 3 does not illustrate interconnection wires between the boosting transformers 3A and 3B or interconnection wires between the boosting transformers 3A and 3B and the stage 31C.

The stages 31A, 31B, and 31C are each formed using an insulated substrate 10 having a plate shape, and components such as capacitors 4 and diodes 5 are mounted on the insulated substrates 10. The bottom surface of the insulated substrate 10 of the stage 31A faces the upper surface of the insulated substrate 10 of the stage 31B, and the bottom surface of the insulated substrate 10 of the stage 31B faces the upper surface of the insulated substrate 10 of the stage 31C. The interconnection wires 51Y are wires connecting between the stages 31A and 31B, and the interconnection wires 51X are wires connecting between the stages 31B and 31C.

Note that FIG. 3 illustrates a case in which the interconnection wires 51Y are connected to the bottom surface of the stage 31A, but the interconnection wires 51Y may be connected to the upper surface of the stage 31A. Similarly, FIG. 3 illustrates a case in which the interconnection wires 51X are connected to the bottom surface of the stage 31B, but the interconnection wires 51X may be connected to the upper surface of the stage 31B.

In each of the stages 31A to 31C, for example, the diodes 5 are disposed on the upper surface of the insulated substrate 10, and the capacitors 4 are disposed on the bottom surface of the insulated substrate 10. Note that the capacitors 4 may be disposed on the upper surface, and the diodes 5 may be disposed on the bottom surface, of the insulated substrate 10 of each of the stages 31A to 31C. In the surrounding container 30, the upper surface of the insulated substrate 10 and each of the diodes 5 are connected to each other by leads 9B, and the bottom surface of the insulated substrate 10 and each of the capacitors 4 are connected to each other by leads 9A. In the surrounding container 30, the output voltage from the boosting transformers 3A and 3B is gradually boosted in the stage 31C, in the stage 31B, and in the stage 31A, and is then output from the end output portion 13.

The stages 31A to 31C constituting the CW circuit 1 each have input portions 11 and output portions 12 for interconnection between stages. The input portions 11 and the output portions 12 are provided in a substrate edge portion of the insulated substrate 10. The input portions 11 each receive the voltage from the insulated substrate 10 therebelow. The output portions 12 each output a voltage boosted by the CW circuit 1 to the insulated substrate 10 thereabove.

The output portions 12 of the stage 31C and the input portions 11 of the stage 31B are provided in portions for connection with the interconnection wires 51X. The output portions 12 of the stage 31B and the input portions 11 of the stage 31A are provided in portions for connection with the interconnection wires 51Y.

In the CW circuit 1, the output portions 12 of the stage 31C and the input portions 11 of the stage 31B are electrically connected to each other, and the output portions 12 of the stage 31B and the input portions 11 of the stage 31A are electrically connected to each other.

As described above, stacking the electrically-connected stages 31A to 31C one on top of another to be equally spaced from each other allows a boosted DC high voltage to be output from the end output portion 13 of the stage 31A, which is the topmost stage. The stages 31A to 31C may be stacked on one on top of another using a resin spacer interposed therebetween, or stacked on one on top of another by providing support rods 6 between the stages, and fixing the stages with bolts or the like using the support rods 6 as illustrated in FIG. 3. The support rods 6 may be part of the surrounding container 30, or may be separate elements from the surrounding container 30.

In the first embodiment, the insulated substrate 10 is segmented into multiple insulated substrates (i.e., insulated substrates 10A to 10C described later). The configuration of the insulated substrates 10A to 10C will be described later.

Figure 4:
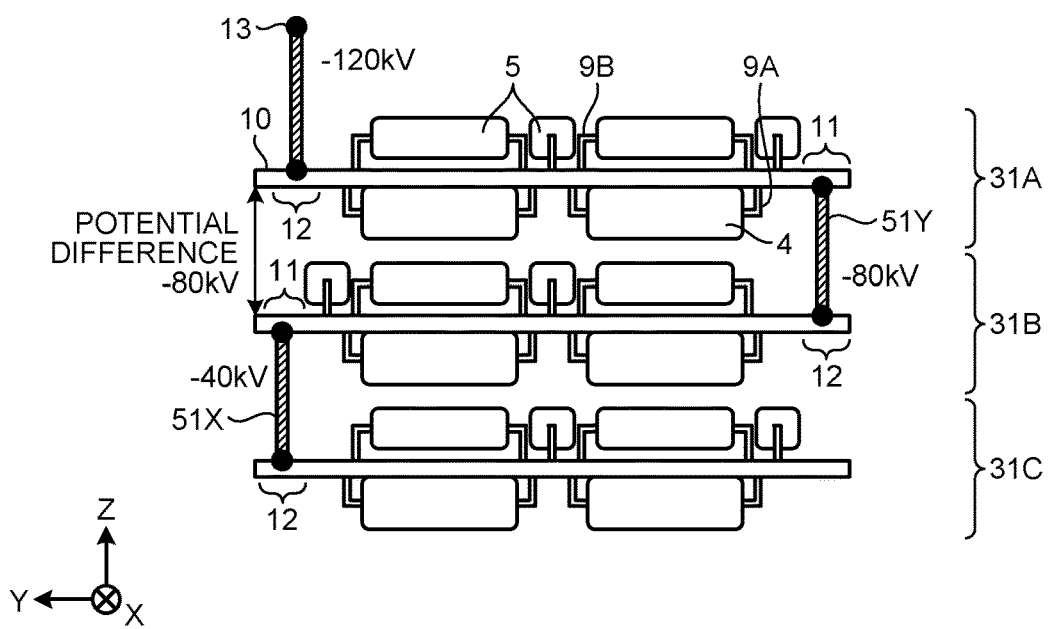
FIG. 4 is a diagram for describing potential differences between stages of the CW circuit included in the voltage generation device according to the first embodiment.

The potential difference between the stages will next be described. FIG. 4 is a diagram for describing potential differences between the stages of the CW circuit included in the voltage generation device according to the first embodiment. FIG. 4 illustrates a side view from the left, of the CW circuit 1. The following description describes potential differences between the stages when the input voltage to the CW circuit 1 is provided by boosting the voltage to ±10 kV, that is, the output of the full-bridge inverter is boosted to ±10 kV by the boosting transformers 3A and 3B.

When the input voltage to the CW circuit 1 is ±10 kV, boosting the voltage by about −40 kV per stage results in the output voltage of the third stage of −120 kV. As illustrated in FIG. 4, a maximum potential difference of −80 kV may appear between the stages. For example, the voltage of −40 kV in the input portion 11 of the stage 31B, which is the second stage, and the voltage of −120 kV in the output portion 12 of the stage 31A, which is the third stage, provides a potential difference of −80 kV. Because the stages 31A to 31C are stacked on one on top of another to be equally spaced from each other, a maximum potential difference appears between the input portion 11 of one stage and the output portion 12 of another stage. That is, a discharge occurs most easily between the input portion 11 of one stage and the output portion 12 of another stage.

Discharge will next be described. Likelihood of occurrence of a discharge depends on the intensity of the electric field. The intensity of the electric field that causes a discharge in air is said to be about 3 kV/mm. The intensity of an electric field depends on the potential difference between two points that are points between which a discharge may occur (hereinafter referred to as discharge candidates), on the distance between the two points, and on the outer shapes at the respective two points. However, when objects at two points that are discharge candidates are both an infinite parallel plate, the electric field depends only on the potential difference and on the distance. The state of such space is called uniform electric field.

In contrast, when objects at two points that are discharge candidates are not infinite parallel plates but protruding objects (e.g., needles, edges of a component, etc.), the intensity of an electric field depends on the potential difference between two points that are discharge candidates, on the distance between the two points, and on the outer shapes. With a constant potential difference and a constant distance, an outer shape having an acuter angle at each of two points that are discharge candidates produces a higher electric field, while the outer shape that is more spherical produces a lower electric field. The state of such space is called non-uniform electric field.

Furthermore, a discharge called creeping discharge may occur. A creeping discharge occurs from an originating point that is a triple junction (hereinafter referred to as TJ portion), which is a local field concentration point, and appears at a boundary of two dielectric materials and one electrically-conductive material, such as a gas-insulator-electrode boundary. Such discharge develops along the interface between the different dielectric materials, and occurs at a voltage lower than the discharge voltage in air.

Considering the possibility of occurrence of a creeping discharge between conductors (e.g., a lead of a component, solder, an electrically-conductive pattern, and/or the like) having different potentials on the insulated substrate 10 in a circuit that outputs a high voltage such as the CW circuit 1, a sufficient creepage surface dielectric strength needs to be ensured. One method for ensuring a sufficient creepage surface dielectric strength is to use a larger-size component to increase the electrode spacing, but an increase in the component size leads to an increase in the size of the circuit.

In the first embodiment, the insulated substrate 10 of the stage 31A is divided into the insulated substrates 10A to 10C, each of which is a substrate unit, thereby maintaining a small size and preventing occurrence of a creeping discharge. On the other hand, a stage (stage 31X of a comparative example described later) has been used that has a slit between conductors on the insulated substrate to ensure a sufficient creepage surface dielectric strength without an increase in the circuit size.

Figure 5:
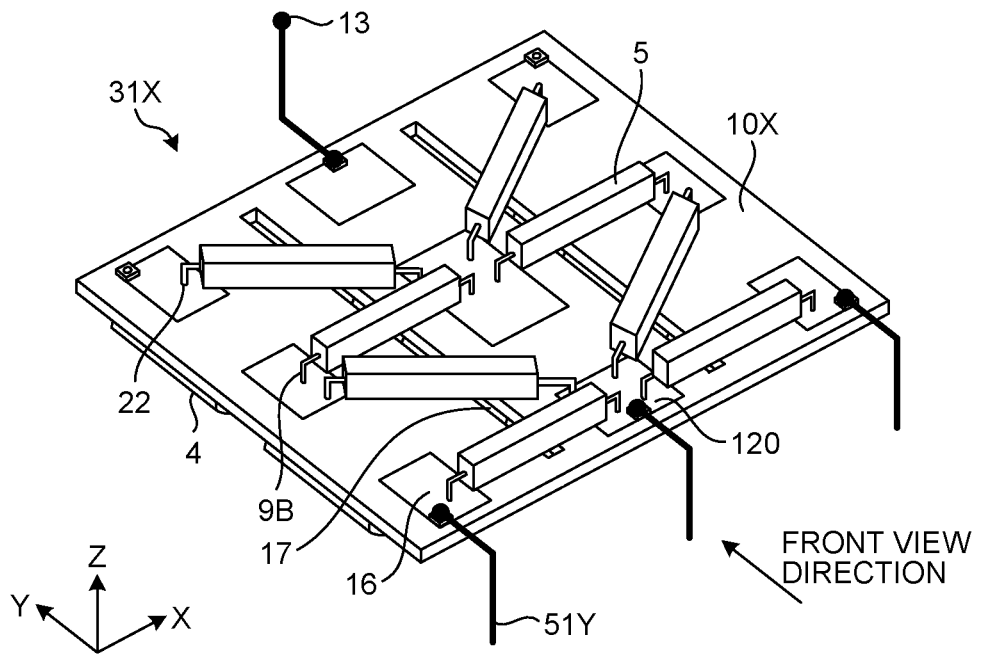
FIG. 5 is a perspective view illustrating a structure of a stage of a comparative example.
Figure 6:
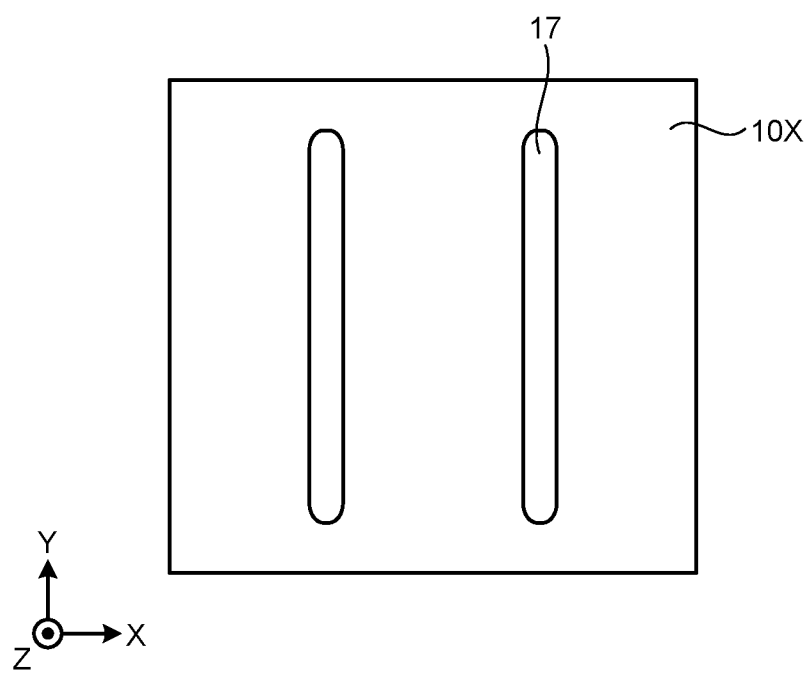
FIG. 6 is a top view illustrating a configuration of an insulated substrate included in the stage of the comparative example.
Figure 7:
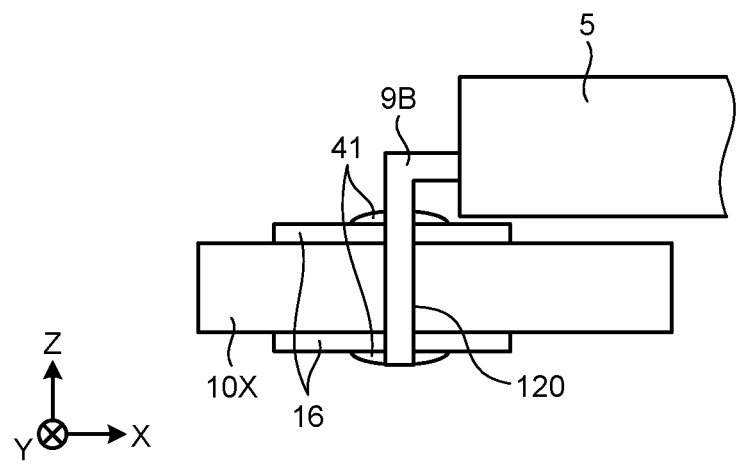
FIG. 7 is a diagram for describing a cross-sectional configuration of the stage of the comparative example, taken along a plane parallel to the XZ plane.

A configuration of a stage having a slit formed between leads will now be described as a stage of a comparative example for comparison with the stages 31A to 31C of the first embodiment. FIG. 5 is a perspective view illustrating a structure of a stage of the comparative example. FIG. 6 is a top view illustrating a configuration of an insulated substrate included in the stage of the comparative example. FIG. 7 is a diagram for describing a cross-sectional configuration of the stage of the comparative example, taken along a plane parallel to the XZ plane.

The diodes 5 and the capacitors 4 are disposed at positions similar to the positions on the insulated substrate 10 described above, on an insulated substrate 10X included in the stage 31X of the comparative example. In contrast to the stage 31A on which the CW circuit 1 of the first embodiment is arranged and which includes the insulated substrate 10 divided into the insulated substrates 10A to 10C, the stage 31X of the comparative example includes the insulated substrate 10X not divided.

The stage 31X of the comparative example has a slit structure. The stage 31X is disposed in the surrounding container 30 similarly to the stages 31A to 31C. As compared to the stages 31A to 31C, the stage 31X differs from the stages 31A to 31C in that slits 17 are provided between conductors on the insulated substrate 10X. The diodes 5 and the capacitors 4 are disposed on the insulated substrate 10X similarly to the insulated substrate 10.

FIG. 5 illustrates the stage 31X in which the slits 17 are each provided between the leads 9B of a single one of the diodes 5 in the stage 31X. FIG. 6 illustrates the insulated substrate 10X having the slits 17 as viewed from the Z-axis direction. FIG. 7 illustrates a cross-sectional view of one of the diodes 5 taken along a plane parallel to the longitudinal direction of the diode 5 to cause the cut plane to include the two leads 9B provided at both ends of the diode 5.

Portions where the diodes 5 and the capacitors 4 are connected to each other in the insulated substrate 10X are each designated a component connection portion 22. The component connection portions 22 of the insulated substrate 10X each have a through-hole 120 formed therein. The diode 5 has the leads 9B, extending in the longitudinal direction of the diode 5. The leads 9B are bent in the downward direction, i.e., the direction toward the insulated substrate 10X, are penetrated through the through-holes 120 from the upper surface to the bottom surface, and are soldered to an electrically-conductive pattern 16 using solder 41 on each of the upper surface and the bottom surface of the insulated substrate 10X.

Thus, each of the diodes 5 of the insulated substrate 10X is soldered to the insulated substrate 10X at two positions of the respective through-holes 120. Each of the slits 17 is provided in the insulated substrate 10X between these two solder joints. In other words, the diode 5 is disposed to cross the slit 17. In addition, one of the leads 9B of the diode 5 is joined to the insulated substrate 10X on one side across the slit 17, and the other one of the leads 9B of the diode 5 is joined to the insulated substrate 10X on the other side across the slit 17.

As described above, the stage 31X of the comparative example can improve the dielectric strength between the joints of the two leads 9B connected to the diode 5, in the creepage direction of the insulated substrate 10X, by providing the slit 17. On the other hand, the slit 17 may allow a partial discharge to occur in a space in the slit 17. A partial discharge may generate ozone, which accelerates degradation of the insulated substrate 10X, degradation of the insulator, and/or the like. This may in turn cause a short-circuit fault of the CW circuit included in the stage 31X of the comparative example.

Figure 8:
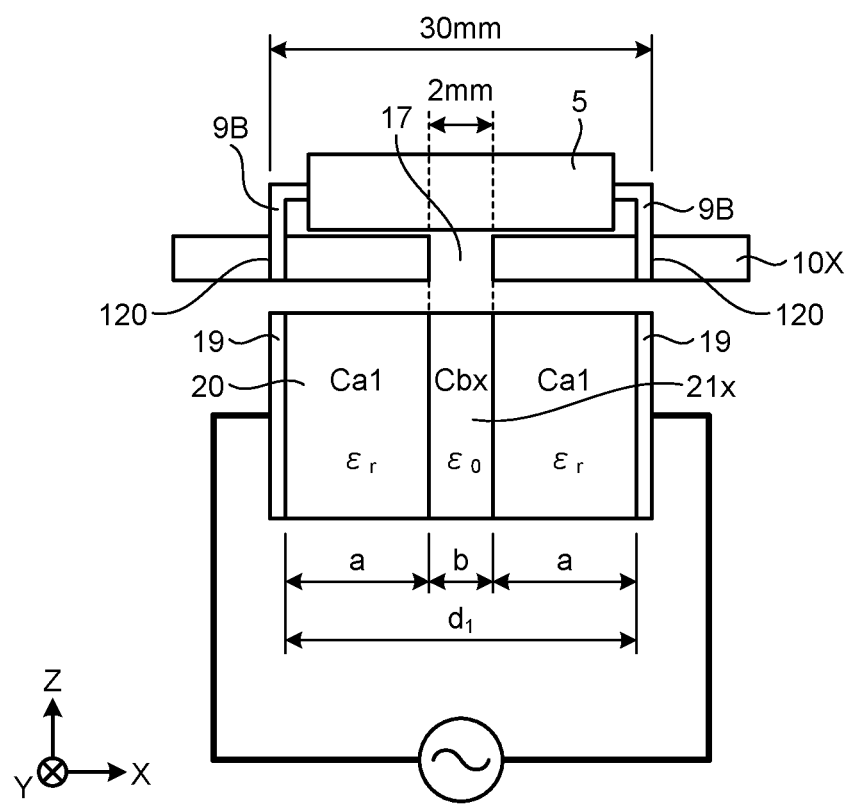
FIG. 8 is a diagram for describing the electric field intensity in the slit of the stage of the comparative example.

To describe the problem of the slits 17, electric field in the slits 17 will next be described. FIG. 8 is a diagram for describing electric field intensity in the slit of the stage of the comparative example. FIG. 8 illustrates the cross-sectional shape of the diode 5 of the stage of the comparative example, and a model of the capacitor representing the capacitance along the creepage direction between the leads 9B disposed through the through-holes 120.

The model of the capacitor has a structure in which an air layer 21x in the slit 17 is sandwiched by dielectric layers 20 simulating the insulated substrate 10X, and the dielectric layers 20 are, in turn, sandwiched by electrodes 19 and 19 simulating the leads 9B. An AC voltage is applied across these electrodes 19 and 19. The symbol so represents the permittivity of vacuum ($8.85 \times 10^{-12}$ F/m), and the symbol $\varepsilon_r$ represents the relative permittivity of the insulated substrate 10X, which is a printed board. Note that it is assumed that the printed board is a double-sided board, and the base material (herein, glass epoxy) has a relative permittivity of 4. The symbol Ca1 represents the capacitance between each of the leads 9B and the slit 17, and the symbol Cbx represents the capacitance inside the slit 17. In addition, the symbol a is the distance between each of the leads 9B and the slit 17, b is the slit width between the edges of the insulated substrate 10X, and $d_1$ represents the distance between the leads 9B. A relationship of $d_1=2a+b$ holds in this example.

When the space between the parallel plates contains only air, the electric field intensity E between the parallel plates is generally expressed as E=V/d (V: potential difference between the base plates, d: distance between the base plates). As illustrated in FIG. 8, when the space between the electrodes 19 and 19 is formed of two types of layers, i.e., the air layer 21x and the dielectric layers 20, which are insulation layers, the electric field intensity $E_1$ in the dielectric layers 20 is expressed as $E_1=(\varepsilon_0/(2a\varepsilon_0+b\varepsilon)) \times V$, and the electric field intensity $E_2$ in the air layer is expressed as $E_2=(\varepsilon/(2a\varepsilon_0+b\varepsilon)) \times V$, where $\varepsilon=\varepsilon_r \cdot \varepsilon_0$.

The electric field intensity in the air layer 21x depends on the ratio between the width of each of the dielectric layers 20 and the width of the air layer 21x, and is higher with a shorter width of the air layer 21x. However, the electric field intensity does not increase in proportion to the distance, but the maximum value is $E=\varepsilon_r(V/d)$. That is, the electric field intensity in the air layer 21x does not increase indefinitely, but converges at the product of multiplication of the electric field intensity when there is only the air layer 21x, by the relative permittivity.

A calculation is now made of the electric field intensity when, by way of example, a voltage of −120 kV is output from the end output portion 13 assuming that the input voltage to the CW circuit 1 is ±10 kV, and that the total number of the voltage-doubling boost circuit portions 60 connected in series is 6.5. In this case, the AC voltage applied to the diode 5 has an amplitude of 9.2 kV. It is also assumed that the distance between the leads 9B is 30 mm, and the slit width (hereinafter referred to as slit width SW), which is the width of the slit 17, is 2 mm. A result of calculation of the electric field intensity in this case is illustrated in FIG. 9.

Figure 9:
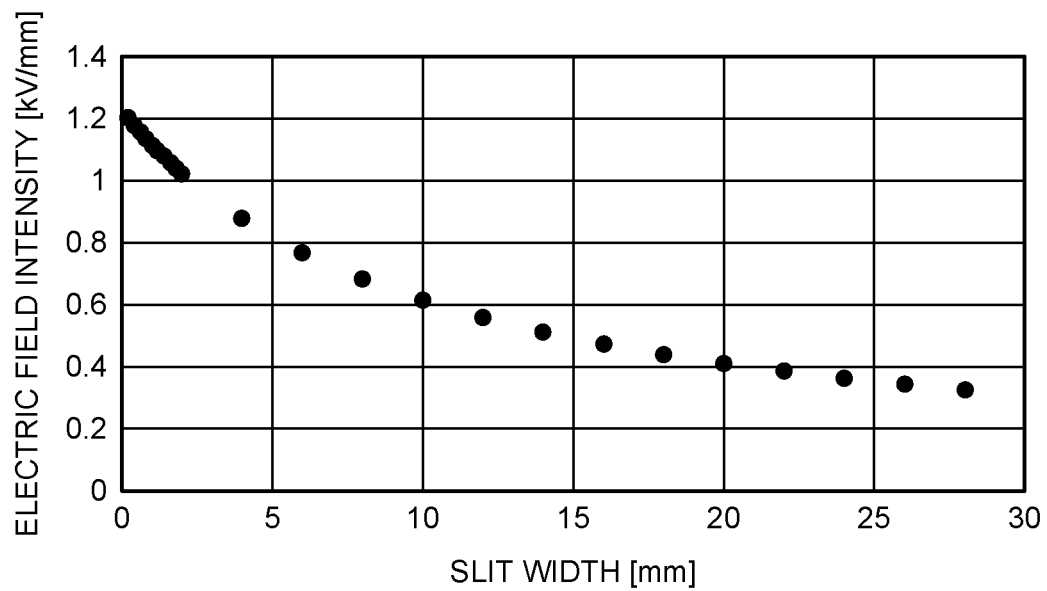
FIG. 9 is a diagram illustrating a relationship between the slit width and the electric field intensity.

FIG. 9 is a diagram illustrating a relationship between the slit width and the electric field intensity. FIG. 9 illustrates a result of calculation of the electric field intensity in the air layer 21 in the slit 17. In FIG. 9, the horizontal axis represents the slit width SW (unit: mm), and the vertical axis represents the electric field intensity [kV/mm] in the air layer 21x in the slit 17.

As illustrated in FIG. 9, a slit width SW of 2 mm results in electric field intensity in the air layer 21x in the slit 17 of 1.02 kV/mm. Considering that the breakdown electric field of air is 3 kV/mm, the electric field intensity in the air layer 21x in the slit 17 is typically has a design value of 1 kV/mm, which is a third (⅓) of the breakdown electric field of air, including a margin. Accordingly, the electric field intensity in the slit 17 of 1.02 kV/mm requires a slit width SW of 3 mm or greater. Thus, when the slit 17 is provided between conductors having different potentials, a wider slit width SW is required to prevent a partial discharge in the air layer 21x in the slit 17. However, even with a wider slit width SW, there are still considerations including the shape of slit end portions, which are end portions of the slit 17, and the positional relationship between each of the slit end portions and the applicable component.

Figure 10:
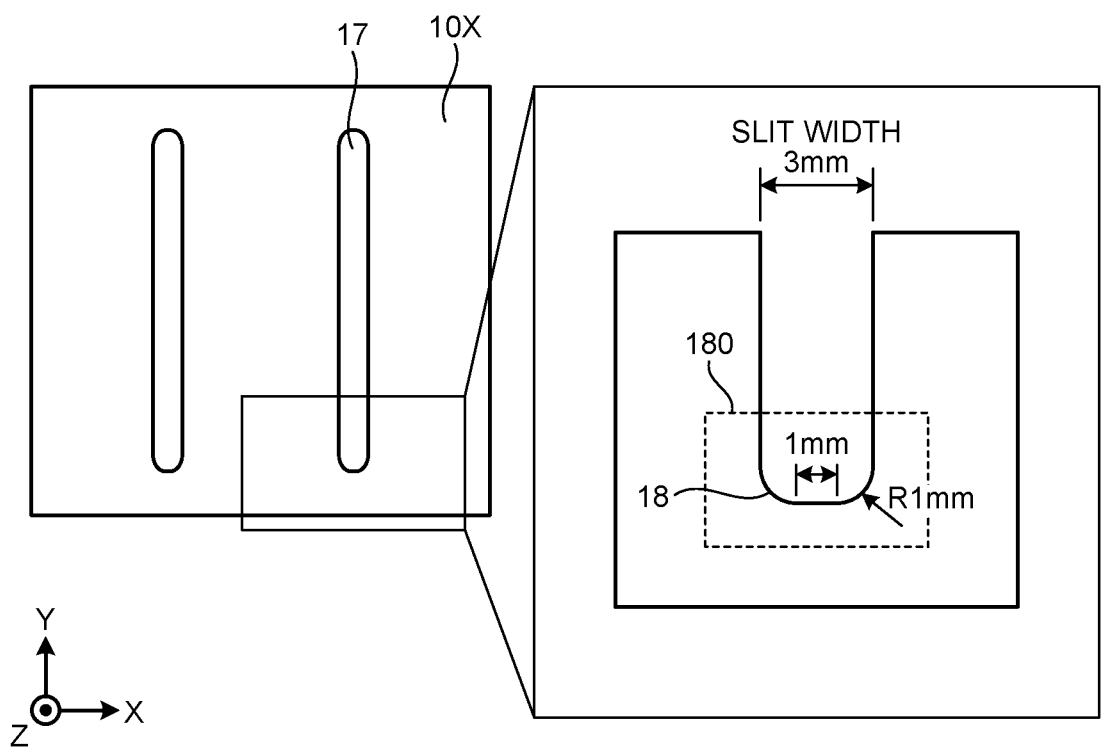
FIG. 10 is a diagram for describing a shape of a slit end portion in the insulated substrate of the comparative example.

The shape of a slit end portion 18 will first be described. FIG. 10 is a diagram for describing the shape of the slit end portions in the insulated substrate of the comparative example. FIG. 10 illustrates a top view of the insulated substrate 10X and an enlarged view of the slit end portion 18. FIG. 10 presents the enlarged view of the slit end portion 18 to the right of the top view of the insulated substrate 10X.

FIG. 10 illustrates a case in which the insulated substrate 10X has two of the slits 17. As illustrated in the enlarged view on the right of FIG. 10, an area 180 surrounded by a broken line is an area including the slit end portion 18.

The slit 17 is a groove in the depth direction, which is parallel to the Z-axis direction, and penetrates the insulated substrate 10X in a direction parallel to the Z-axis direction. The slit 17 has, for example, a linear shape as viewed from above the insulated substrate 10X. One end portion in the longitudinal direction, of the slit 17 is the slit end portion 18. The slit end portion 18 is round as viewed from above the insulated substrate 10X.

The slit 17 is produced by, for example, machining using a cylindrical router having a diameter of 2 mm. Although a router having a diameter of 1 mm is also available, it is easily broken and is slow in machining speed leading to a high machining cost; therefore, such router is not used often. Meanwhile, a router having a diameter greater than 2 mm is also available, but a router having a larger diameter causes more stress on the insulated substrate 10X, which is the workpiece, thereby causing high vibration during machining when the slit 17 is produced in the insulated substrate 10X. This is more likely to cause a fracture and a solder crack of the insulated substrate 10X. This also reduces the strength of edge portions of the insulated substrate 10X, thereby more easily causing a fracture of the insulated substrate 10X by vibration during transportation or a twist during assembling. Thus, a router having a diameter greater than 2 mm is not used often. When the slit 17 having a width of 3 mm is produced by machining using a router having a diameter of 2 mm, both end portions (which are each the slit end portion 18) of the slit 17 having an elongated shape will have a bend radius (R) of 1 mm by use of the cylindrical router. Thus, the slit end portion 18 will not be rectangular as viewed from above the insulated substrate 10X, and will fail to maintain a slit width SW of 3 mm.

Figure 11:
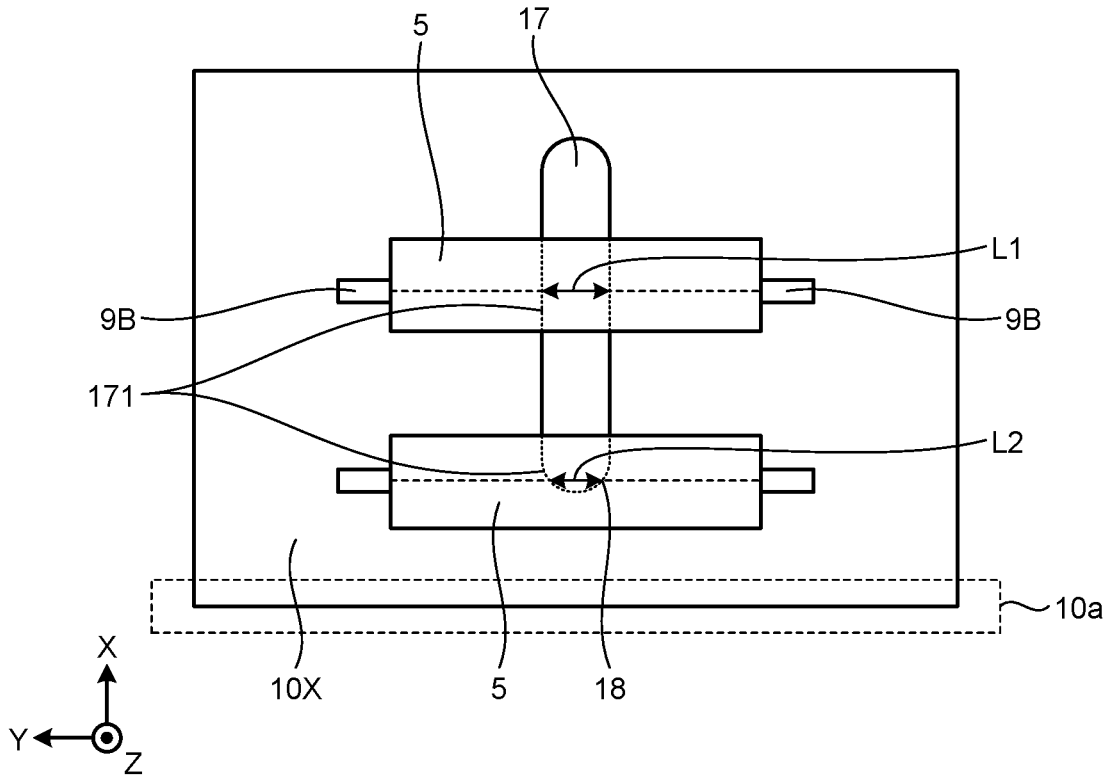
FIG. 11 is a diagram for describing a positional relationship between a slit end portion and diodes in the insulated substrate of the comparative example.

A positional relationship between the slit end portion 18 and the diodes 5, each of which is a component, will next be described. FIG. 11 is a diagram for describing a positional relationship between the slit end portion and the diodes in the insulated substrate of the comparative example. FIG. 11 illustrates a top view of the insulated substrate 10X when the slit 17 is formed in the insulated substrate 10X, and two of the diodes 5 are disposed to cross the slit 17.

The upper one of the diodes 5 illustrated in FIG. 11 is disposed to cross near a center portion of the slit 17, and the lower one of the diodes 5 is disposed to cross the slit end portion 18. Each of boundaries 171 indicated by a black dotted line, of the boundary between the slit 17 and the insulated substrate 10X, represents the boundary hidden under the diode 5. In addition, FIG. 11 indicates the slit width SW near the center portion of the slit 17 by a width L1, and the slit width SW in the slit end portion 18 of the slit 17 by a width L2.

Compare the slit width SW (width L1) in the center portion of the slit 17 positioned right under the corresponding diode 5 and the slit width SW (width L2) in the slit end portion 18 positioned right under the corresponding diode 5. Due to the curved shape of the slit end portion 18, the slit width SW between the leads 9B of the corresponding diode 5 is smaller than the slit width SW near the center portion of the slit 17; that is, width L1>width L2. Accordingly, a slit width SW sufficient for avoiding a breakdown cannot be ensured in the slit end portion 18.

When multiple components are mounted on the insulated substrate 10X having a specified size, the components are arranged to be spaced apart from one another as distantly as possible to ensure an insulation distance. Accordingly, some of the components are disposed near an outer edge portion 10a of the insulated substrate 10X. The slits 17 for ensuring a sufficient creepage surface dielectric strength are also formed to near the outer edge portion 10a of the insulated substrate 10. This causes the slit end portion 18 to be positioned right under a component disposed near the outer edge portion 10a of the insulated substrate 10, thereby failing to ensure a slit width SW sufficient for avoiding a breakdown. That is, a component disposed near the outer edge portion 10a is not enabled to cross an area having a sufficient slit width SW, but is caused to cross an area having an insufficient slit width SW, thereby failing to ensure a sufficient slit width SW. Thus, a configuration in which the slits 17 are provided in the insulated substrate 10X as seen in the comparative example presents a problem of occurrence of a partial discharge on the insulated substrate 10X. As described above, components to be mounted on the insulated substrate 10X need to be mounted on an area within a specified size of the insulated substrate 10X for size reduction of power supplies while maintaining an insulation distance from an adjacent component. This causes the slit end portion 18 to be positioned right under a component, thereby causing a partial discharge to more easily occur.

Thus, in the first embodiment, the insulated substrate 10 is separated from each other at a position of the slit end portion 18, where a partial discharge easily occurs, to form a divided structure. That is, in the first embodiment, the insulated substrate 10 is divided to prevent formation of the slit end portion 18 having an insufficient slit width SW. In other words, in the first embodiment, the slits 17 are extended to penetrate the outer edge portion 10a to divide the insulated substrate 10 by a space.

A structure of the stages 31A to 31C, in which the CW circuit 1 according to the first embodiment is arranged, will next be described. Note that because the stages 31A to 31C have similar structures, a structure of the stage 31A will next be described.

Figure 12:
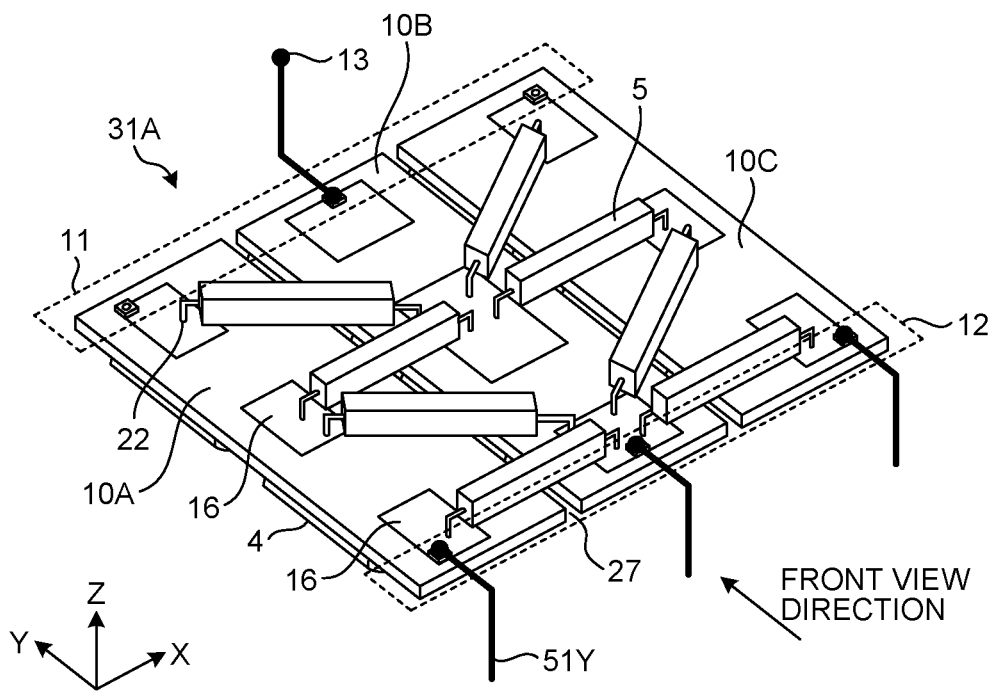
FIG. 12 is a perspective view illustrating a structure of the stage in which the CW circuit according to the first embodiment is arranged.
Figure 13:
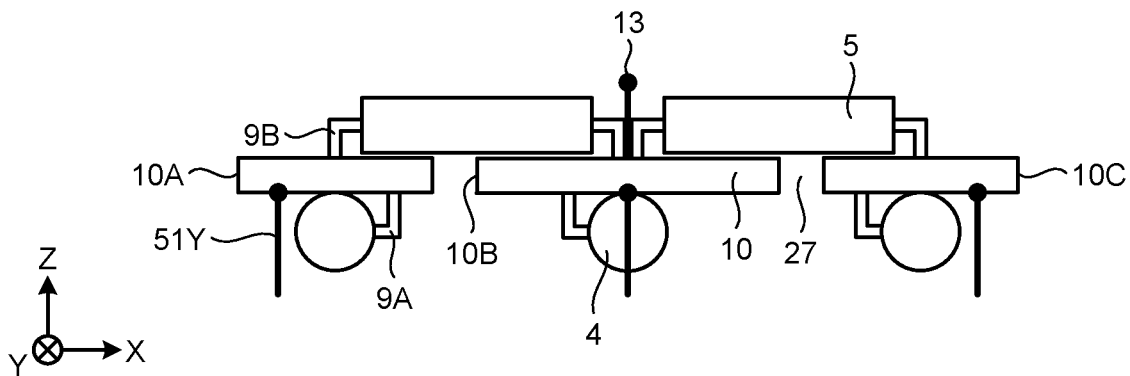
FIG. 13 is a front view illustrating the structure of the stage in which the CW circuit according to the first embodiment is arranged.
Figure 14:
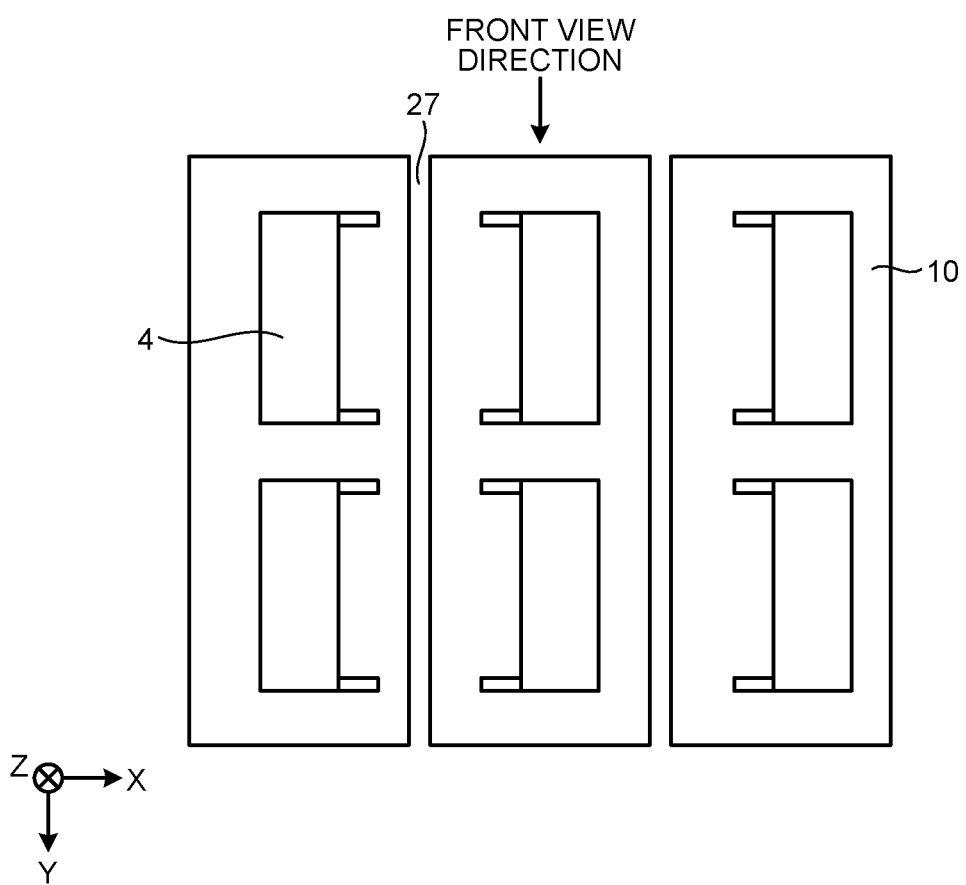
FIG. 14 is a bottom view illustrating the structure of the stage in which the CW circuit according to the first embodiment is arranged.

FIG. 12 is a perspective view illustrating a structure of the stage in which the CW circuit according to the first embodiment is arranged. FIG. 13 is a front view illustrating the structure of the stage in which the CW circuit according to the first embodiment is arranged. FIG. 14 is a bottom view illustrating the structure of the stage in which the CW circuit according to the first embodiment is arranged. The cross-sectional configuration of the stage 31A, taken along a plane parallel to the XZ plane, is similar to the cross-sectional configuration illustrated in FIG. 7.

FIGS. 12 to 14 illustrate a structure of the stage 31A. FIG. 13 illustrates a front view of the stage 31A as viewed from the Y-axis direction, which is the front view direction. FIG. 14 illustrates a bottom view of the stage 31A as viewed from the Z-axis direction.

In comparison, the stage 31A and the afore-mentioned stage 31X differ in the shape of the insulated substrate. That is, in the stage 31A, the insulated substrate 10 is divided by segmenting areas 27 extending in the Y-axis direction into the insulated substrates 10A to 10C interposing therebetween the segmenting areas 27, which are air layers. In contrast, a single plate of the insulated substrate 10X is used in the stage 31X. The component arrangement positions of the stage 31A and the component arrangement positions of the stage 31X are the same as each other. Note that the air layers of the segmenting areas 27 can otherwise be atmospheric environment of the insulation layer such as gas, oil, or resin. In addition, examples of the gaseous material such as a gas in the insulation layer include dry air, nitrogen, hydrogen, and sulfur hexafluoride in addition to air.

The stage 31A includes the insulated substrates 10A to 10C, the capacitors 4, and the diodes 5. The insulated substrates 10A to 10C correspond to the afore-mentioned insulated substrate 10. The insulated substrates produced by division of the insulated substrate 10 into three parts are the insulated substrates 10A to 10C. The following description may refer to each of the insulated substrates 10A to 10C as insulated substrate 10. An example of each of the insulated substrates 10A to 10C is a printed board.

FIG. 12 illustrates an example in which multiple capacitors 4 and multiple diodes 5 are disposed on the insulated substrate 10. The capacitors 4 are provided such that two thereof are disposed in series connection with each other on the rear surface of each of the insulated substrates. The diodes 5 are provided such that four thereof are disposed on the upper surfaces to cross a gap between two of the insulated substrates. Specifically, the capacitors 4 are provided such that two thereof are disposed in series connection with each other on the bottom surface of each of the insulated substrates 10A to 10C. In addition, the diodes 5 are provided such that four thereof are disposed on the upper surfaces of the insulated substrates 10A and 10B to cross the gap between the insulated substrates 10A and 10B, and other four thereof are disposed on the upper surfaces of the insulated substrates 10B and 10C to cross the gap between the insulated substrates 10B and 10C.

The diodes 5 are connected to the insulated substrates 10A to 10C by the leads 9B on the upper surfaces of the insulated substrates 10A to 10C. The capacitors 4 are connected to the insulated substrates 10A to 10C by the leads 9A on the bottom surfaces of the insulated substrates 10A to 10C.

The leads 9A of the capacitors 4 and the leads 9B of the diodes 5 are connected to the insulated substrates 10A to 10C at the positions of the component connection portions 22 described referring to FIG. 5. As illustrated in FIG. 7, these component connection portions 22 each have the through-hole 120 (not illustrated in FIG. 12 or 13) formed from the upper surface to the bottom surface of each of the insulated substrates 10A to 10C. The leads 9A and 9B are provided to extend in a direction parallel to the insulated substrates 10, and are bent at positions near the through-holes 120 (that is, lead-forming process is performed).

The leads 9B penetrate the through-holes 120 from the upper surfaces to the bottom surfaces of the insulated substrates 10A to 10C. That is, the leads 9B are each inserted into the corresponding one of the through-holes 120 from the upper surface side of the corresponding one of the insulated substrates 10A to 10C, and are drawn to the bottom surface side of the corresponding one of the insulated substrates 10A to 10C. Similarly, the leads 9A penetrate the through-holes 120 from the bottom surfaces to the upper surfaces of the insulated substrates 10A to 10C. That is, the leads 9A are each inserted into the through-hole 120 from the bottom surface side of the corresponding one of the insulated substrates 10A to 10C, and are drawn to the upper surface side of the corresponding one of the insulated substrates 10A to 10C.

An electrically-conductive pattern (not illustrated in FIGS. 12 to 14) similar to the electrically-conductive pattern 16 illustrated in FIG. 7 is arranged around the through-hole 120 on each of the upper surface and the bottom surface of the insulated substrate 10, thereby electrically connecting the leads 9A and 9B to the insulated substrates 10A to 10C by soldering. An example of the electrically-conductive pattern is a copper foil pattern.

Note that the shapes of the insulated substrates 10A to 10C, the arrangements of the capacitors 4 and of the diodes 5, the positions of the component connection portions 22, of the through-holes 120, and of the electrically-conductive patterns 16, and the like are not limited to the shapes, the arrangements, and the positions illustrated in FIGS. 12 to 14.

In addition, the stages 31A to 31C may be configured such that at least one of the capacitors 4 and the diodes 5 crosses the air layer that is the corresponding one of the segmenting areas 27 between the insulated substrates 10A to 10C. This can improve the dielectric strength along the creepage direction of the capacitor 4 or of the diode 5 crossing the air layer that is the corresponding one of the segmenting areas 27.

Such configuration can remove, from the insulated substrate 10, a portion having a small slit width SW such as the slit end portion 18, where a partial discharge may easily occur, and can thus prevent occurrence of a partial discharge right under a component disposed near the outer periphery of the insulated substrate 10.

Thus, according to the first embodiment, the insulated substrate 10 in each stage constituting the CW circuit 1 serving as a boost circuit is divided into multiple parts such as the insulated substrates 10A to 10C. In addition, the diodes 5, which are components, are disposed to cross the insulated substrates 10A to 10C produced by division into multiple parts in each stage of the voltage generation device 100. Thus, an increased dielectric strength along the creepage direction and a size reduction can both be provided.

Second Embodiment

A second embodiment will next be described with reference to FIGS. 15 and 16. The first embodiment has been described in the context of a divided structure such as that of the insulated substrates 10A to 10C produced by dividing the insulated substrate 10 to remove the slit end portion 18, where a partial discharge easily occurs. In the second embodiment, the insulated substrate 10 has a divided structure, and the insulated substrates 10A to 10C produced by the division differ in the height, which is the position along the Z-axis direction, between adjacent ones of the insulated substrates.

Figure 15:
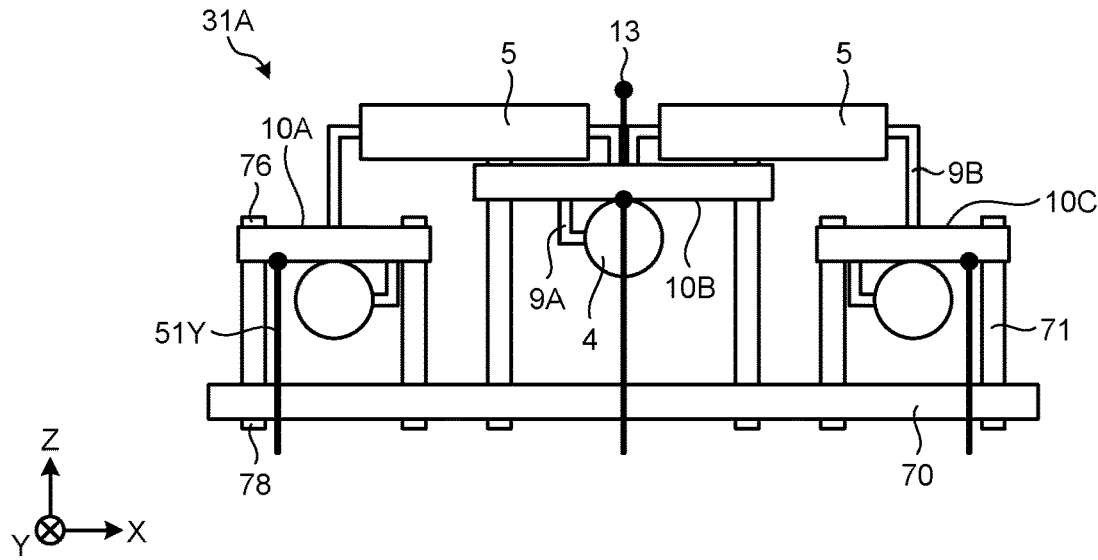
FIG. 15 is a front view illustrating a structure of the stage in which a CW circuit according to a second embodiment is arranged.

FIG. 15 is a front view illustrating a structure of the stage in which the CW circuit according to the second embodiment is arranged. Among the components of FIG. 15, components providing functionality identical to the functionality of the stages 31A to 31C described in the first embodiment are designated by like reference characters, and duplicate description will be omitted. Note that because the stages 31A to 31C have similar structures also in the second embodiment, a structure of the stage 31A will next be described.

FIG. 15 illustrates a structure of the stage 31A, which is a structure of one stage. The stage 31A includes the insulated substrates 10A to 10C, the capacitors 4, the diodes 5, an insulation plate 70 serving as a base of the insulated substrates 10A to 10C, spacers 71, and bolts 76 and 78. The spacers 71 fix the insulated substrates 10A to 10C to be vertically spaced apart from the insulation plate 70. The bolts 76 secure the spacers 71 to the insulated substrates 10A to 10C. The bolts 78 secure the spacers 71 to the insulation plate 70.

Note that, also in the second embodiment, the component arrangement positions as viewed from above the stage 31A and the component arrangement positions as viewed from below the stage 31A are the same as the component arrangement positions of the stage 31A of the first embodiment. However, the shapes of the insulated substrates 10A to 10C and the arrangement positions of the capacitors 4 and of the diodes 5 are not limited to the shapes and the arrangement positions described in the first embodiment.

In the stage 31A, end portions on one side of the respective spacers 71 are fixed to the insulated substrates 10A to 10C by tightening the bolts 76 from above the insulated substrates 10A to 10C. In addition, end portions on another side of the respective spacers 71 are fixed to the insulation plate 70 by tightening the bolts 78 from below the insulated substrates 10A to 10C. Thus, the insulated substrates 10A to 10C and the insulation plate 70 are fixed to each other with the spacers 71 interposed therebetween.

In addition, in the stage 31A, the spacers 71 for fixing the insulated substrates 10A to 10C to the insulation plate 70, which is the base insulation plate, have different lengths for the insulated substrates 10A to 10C. Specifically, the spacers 71 cause the insulated substrates 10A to 10C to be positioned at different heights so that adjacent ones of the insulated substrates 10A to 10C are not at the same height. That is, adjacent ones of the insulated substrates 10A to 10C have the upper surfaces and the bottom surfaces parallel to the XY plane, positioned at heights different from each other along the Z-axis direction, among the insulated substrates 10A to 10C. In other words, the insulated substrates 10A to 10C are disposed in such a manner that adjacent insulated substrates have heights different from each other, where the height is the distance from the insulation plate 70.

Note that the heights of the insulated substrates 10A to 10C and the lengths and the positions of the spacers 71 are not limited to the heights, the lengths, and the positions illustrated in FIG. 15. In addition, the configuration has been described above in which the insulated substrates 10A to 10C are fixed above the insulation plate 70 by way of example. However, the spacers 71 may be provided on lower one or ones of the insulated substrates 10A to 10C to dispose upper one or ones of the insulated substrates 10A to 10C on the spacers 71. That is, upper one or ones of the insulated substrates 10A to 10C may be fixed to lower one or ones of the insulated substrates 10A to 10C with the spacers 71 interposed therebetween.

The electric field intensity in the stage 31A including the insulated substrates 10A to 10C illustrated in FIG. 15 will next be described. FIG. 16 is a diagram for describing the electric field intensity in the air layer of the stage illustrated in FIG. 15. Note that the portion between the insulated substrates 10A and 10B and the portion between the insulated substrates 10B and 10C are configured similarly to each other. Since the electric field intensity in an air layer 21y can thus be calculated similarly for both portions, the following description is provided in the context of the electric field intensity in the air layer 21y between the lead 9B connected to the insulated substrate 10A and the insulated substrate 10B.

Figure 16:
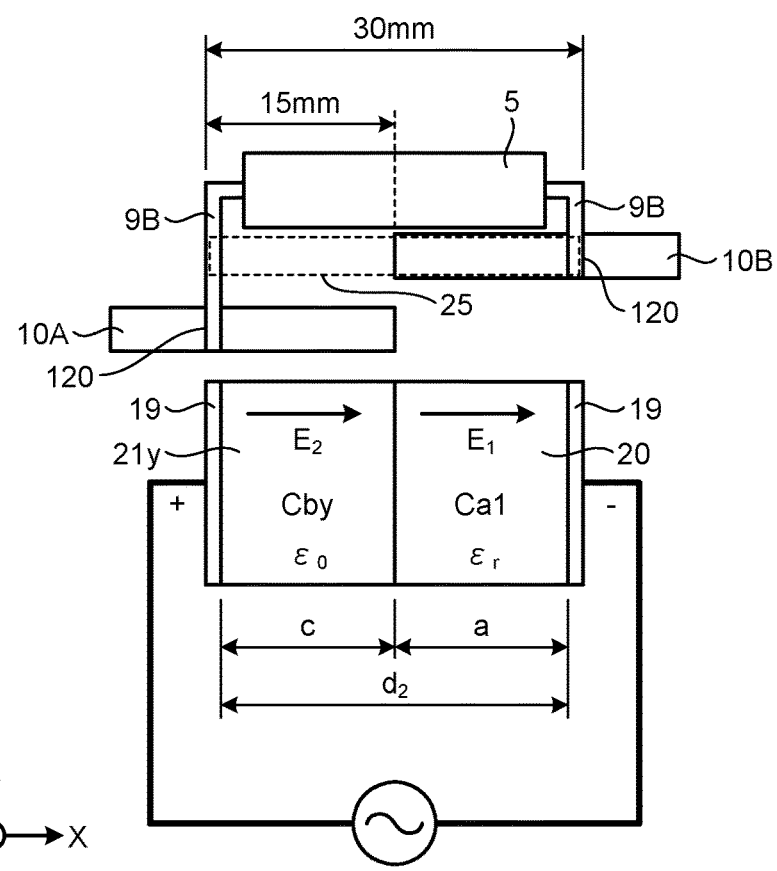
FIG. 16 is a diagram for describing electric field intensity in the air layer of the stage illustrated in FIG. 15.

FIG. 16 illustrates the cross-sectional shape of the diode 5 included in the stage 31A illustrated in FIG. 15, and a model of the capacitor representing the capacitance between the lead 9B connected to the insulated substrate 10B and the lead 9B connected to the insulated substrate 10A. The model of the capacitor illustrated in FIG. 16 is a model representing a situation in which a broken-line area 25 illustrated in FIG. 16 functions as a capacitor. FIG. 16 assumes a case where a gap between the insulated substrates 10A and 10B in the X-axis direction is 0 mm.

Similarly to the insulated substrate 10X described in connection with the first embodiment, the through-holes 120 are formed in the respective component connection portions 22 in the insulated substrates 10A and 10B. The diode 5 has the leads 9B, extending in the longitudinal direction of the diode 5. The leads 9B are bent in the downward direction, i.e., the direction toward the insulated substrates 10A and 10B, are penetrated through the through-holes 120 from the upper surfaces to the bottom surfaces, and are soldered to the electrically-conductive patterns 16 (not illustrated in FIG. 15 or 16) on the upper surfaces and on the bottom surfaces of the insulated substrates 10A and 10B.

The model of the capacitor illustrated in FIG. 16 has a structure in which the dielectric layer 20 simulating the insulated substrate 10B and the air layer 21y are sandwiched by the electrodes 19 and 19 simulating the leads 9B. An AC voltage is applied across these electrodes 19 and 19. The permittivities $\varepsilon_0$ and $\varepsilon_r$ here respectively have the same values as $\varepsilon_0$ and $\varepsilon_r$ of the first embodiment, and the insulated substrates 10A and 10B are each a substrate similar to the insulated substrate 10X described in connection with the first embodiment.

The air layer 21y is a layer between the lead 9B connected to the insulated substrate 10A and the dielectric layer 20. The value Ca1 in this example is the capacitance between the lead 9B connected to the insulated substrate 10B and the air layer 21y. Thus, the capacitance Ca1 is the capacitance of the portion of the insulated substrate 10B included in the model of the capacitor illustrated in FIG. 16, of the insulated substrate 10B. The air layer 21y in this example corresponds to the air layer of the slit 17 illustrated in FIG. 8.

The value Cby is the capacitance of the air layer 21y. The symbol a in this example is the width of the portion of the insulated substrate 10B included in the model of the capacitor illustrated in FIG. 16, that is, the width of the dielectric layer 20. The symbol c is the width of the air layer 21y, and $d_2$ in this example represents the distance between the leads 9B.

Next, similarly to the case in the first embodiment, a calculation is made of the electric field intensity when a voltage of −120 kV is output from the end output portion 13 assuming that the input voltage to the CW circuit 1 is ±10 kV, and the total number of the voltage-doubling boost circuit portions 60 connected in series is 6.5. In this case, the AC voltage applied to the diode 5 has a maximum value of 9.2 kV. In addition, the components are arranged such that the distance between the leads 9B is 30 mm, the gap between the substrates along the creepage direction is 0 mm, and the positions of division into the insulated substrates 10A to 10C are the midpoints of the diodes 5. The electric field intensity in the air layer 21$y$ in this example is 0.49 kV/mm, which satisfies a design value of 1 kV/mm, which is electric field intensity for avoiding a breakdown in the air layer 21$y$.

In the first embodiment, the insulated substrates 10A to 10C need to have a gap therebetween along the creepage direction of 3 mm or greater to maintain the electric field intensity in the air layer at 1 kV/mm or less. In the second embodiment, the width of the air layer 21$y$ between the leads 9B of a component can be increased without an increase in the gaps along the creepage direction between the insulated substrates 10A to 10C, and can thus prevent occurrence of a partial discharge in the air layer 21$y$.

Thus, in the second embodiment, the spacers 71 are provided on the bottom surfaces of the insulated substrates 10A to 10C produced by division, and the spacers 71 have different lengths so that adjacent ones of the insulated substrates 10A to 10C are not at the same height. This can increase the width of the air layer 21$y$ between the leads 9B of a component without an increase in the gap between adjacent ones of the insulated substrates 10A to 10C, and can thus prevent occurrence of a partial discharge in the air layer 21$y$ between the leads 9B of a component. Thus, an increased dielectric strength along the creepage direction and a size reduction can both be provided.

Third Embodiment

A third embodiment will next be described with reference to FIGS. 17 to 21. In the third embodiment, components are fixed not by soldering to the insulated substrate 10, but using component-joint fittings. Use of component-joint fittings eliminates the need for soldering work, and allows a component to be fixed to the insulated substrate 10 using only bolts and nuts, thereby making easier the assembly work in producing the voltage generation device 100.

Figure 17:
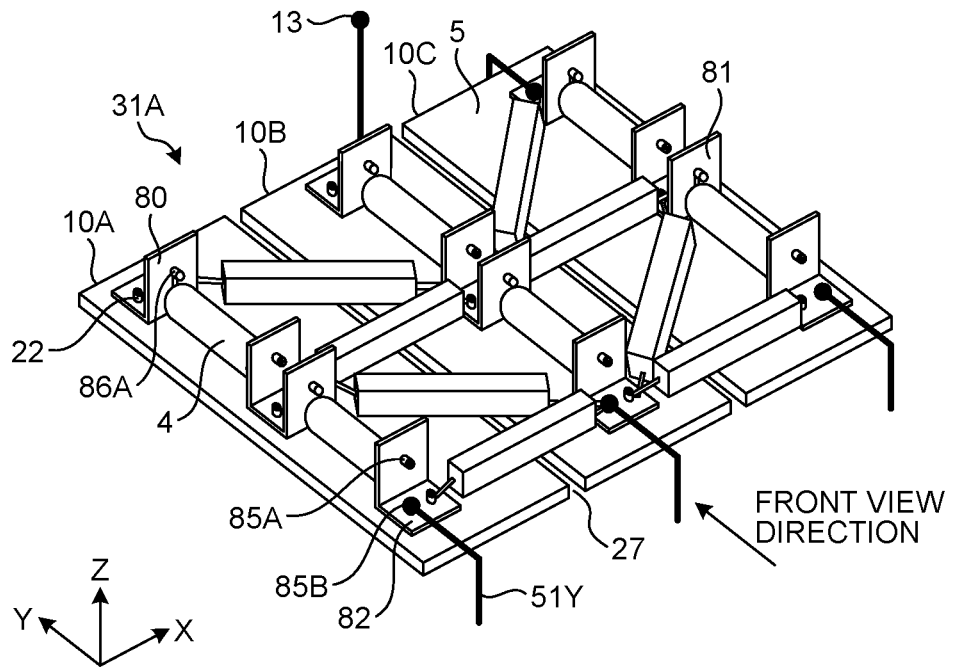
FIG. 17 is a perspective view illustrating a structure of the stage in which a CW circuit according to a third embodiment is arranged.
Figure 18:
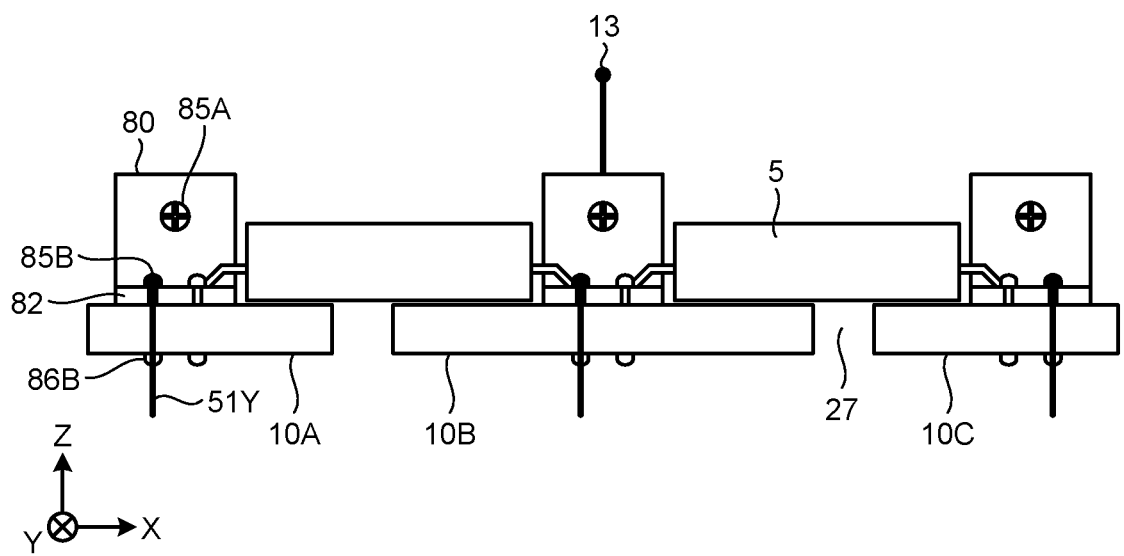
FIG. 18 is a front view illustrating the structure of the stage in which the CW circuit according to the third embodiment is arranged.

FIG. 17 is a perspective view illustrating a structure of the stage in which the CW circuit according to the third embodiment is arranged. FIG. 18 is a front view illustrating the structure of the stage in which the CW circuit according to the third embodiment is arranged. FIG. 18 illustrates a front view of the stage 31A illustrated in FIG. 17 as viewed from the Y-axis direction, which is the front view direction.

Among the components of FIGS. 17 and 18, components providing functionality identical to the functionality of the stages 31A to 31C described in the first and second embodiments are designated by like reference characters, and duplicate description will be omitted. Note that because the stages 31A to 31C of the third embodiment have similar structures, a structure of the stage 31A will next be described. FIGS. 17 and 18 illustrate a structure of the stage 31A, which is a structure of one stage.

In the third embodiment, the stage 31A includes the insulated substrates 10A to 10C, the capacitors 4, the diodes 5, L-shaped joint fittings 80, and U-shaped joint fittings 81. The L-shaped joint fittings 80 are each a component-joint fitting having an L shape. The U-shaped joint fittings 81 are each a component-joint fitting having a U shape. The specific structures of the L-shaped joint fittings 80 and of the U-shaped joint fittings 81 are described later. FIG. 17 illustrates an example in which multiple capacitors 4, multiple diodes 5, multiple L-shaped joint fittings 80, and multiple U-shaped joint fittings 81 are disposed on the insulated substrate 10, consisting of the insulated substrates 10A to 10C.

The capacitors 4 are provided such that two thereof are disposed in series connection with each other on the upper surface of each of the insulated substrates. The diodes 5 are provided such that four thereof are disposed on the upper surface to cross a gap between two of the insulated substrates. Specifically, the capacitors 4 are provided such that two thereof are disposed in series connection with each other on the upper surface of each of the insulated substrates 10A to 10C. In addition, the diodes 5 are provided such that four thereof are disposed on the upper surfaces of the insulated substrates 10A and 10B to cross the gap between the insulated substrates 10A and 10B, and other four thereof are disposed on the upper surfaces of the insulated substrates 10B and 10C to cross the gap between the insulated substrates 10B and 10C.

Note that FIG. 17 illustrates the capacitors 4 as being disposed on the upper surfaces of the insulated substrates 10A to 10C, but the capacitors 4 may be disposed on the bottom surfaces of the insulated substrates 10A to 10C similarly to the first and second embodiments. In addition, the shapes of the insulated substrates 10A to 10C and the arrangement positions and the arrangement directions of components (i.e., the capacitors 4, the diodes 5, the L-shaped joint fittings 80, and the U-shaped joint fittings 81) disposed on the insulated substrates 10A to 10C are not limited to the shapes, the arrangement positions, and the arrangement directions illustrated in FIG. 17. Moreover, FIG. 17 illustrates an example in which the component-joint fittings are the L-shaped joint fittings 80 and the U-shaped joint fittings 81, but the component-joint fittings are not limited to ones having the shape of the L-shaped joint fittings 80 or of the U-shaped joint fittings 81. The component-joint fittings may have any shape that allows components to be electrically joined to the insulated substrates 10A to 10C.

The L-shaped joint fittings 80 are disposed in component connection portions (i.e., the component connection portions 22 illustrated in FIG. 5) provided in both end portions in the Y-axis direction, of the insulated substrates 10A to 10C produced by division into three parts, on the upper surface of the stage 31A. The U-shaped joint fittings 81 are disposed in component connection portions provided in center portions of the insulated substrates 10A to 10C produced by division into three parts, on the upper surface of the stage 31A. On the upper surface of the stage 31A, one of the capacitors 4 is disposed between one of the L-shaped joint fittings 80 disposed in one end portion in the Y-axis direction and one of the U-shaped joint fittings 81; and another one of the capacitors 4 is disposed between the L-shaped joint fitting 80 disposed in another end portion in the Y-axis direction and the U-shaped joint fitting 81.

Each of the capacitors 4 has one of the leads 9A being electrically connected to the L-shaped joint fitting 80, and another one of the leads 9A being electrically connected to the U-shaped joint fitting 81. In addition, the two leads 9B extending from both end portions of the diode 5 are each connected to either the L-shaped joint fitting 80 or the U-shaped joint fitting 81. This makes the capacitors 4 and the diodes 5 electrically connected to each other via the L-shaped joint fitting 80 or the U-shaped joint fitting 81.

Figure 19:
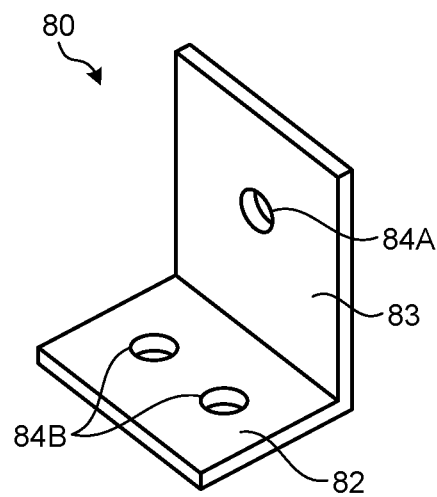
FIG. 19 is a perspective view illustrating a structure of an L-shaped joint fitting included in a voltage generation device according to the third embodiment.
Figure 20:
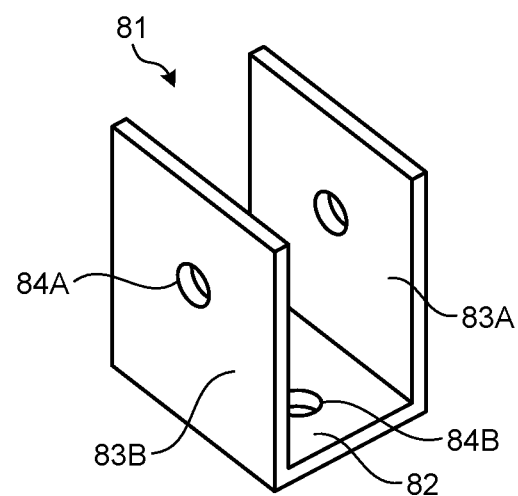
FIG. 20 is a perspective view illustrating a structure of a U-shaped joint fitting included in the voltage generation device according to the third embodiment.

Structures of the L-shaped joint fitting 80 and of the U-shaped joint fitting 81, and a method for connecting components to the L-shaped joint fitting 80 and to the U-shaped joint fitting 81 will next be described. FIG. 19 is a perspective view illustrating a structure of the L-shaped joint fitting included in the voltage generation device according to the third embodiment. FIG. 20 is a perspective view illustrating a structure of the U-shaped joint fitting included in the voltage generation device according to the third embodiment.

The L-shaped joint fitting 80 and the U-shaped joint fitting 81 are each formed by bending an end portion or end portions of an electrically-conductive thin-plate member (e.g., of aluminum, copper, etc.) in the upward direction. The L-shaped joint fitting 80 is a fitting having an L-shaped cross section, formed by bending one end of a thin-plate member in the upward direction. The U-shaped joint fitting 81 is a fitting having a U-shaped cross section, formed by bending both ends of a thin-plate member in the upward direction.

The L-shaped joint fitting 80 includes a bottom portion 82 having a plate shape and a back portion 83 having a plate shape and bent in the upward direction. The bottom portion 82 of the L-shaped joint fitting 80 is secured to the insulated substrate 10. The back portion 83 extends from the bottom portion 82 in the direction perpendicular to the bottom portion 82.

The L-shaped joint fitting 80 also includes bolt through holes 84B in the bottom portion 82 for each allowing a bolt 85B to penetrate therethrough, and a bolt through hole 84A in the back portion 83 for allowing a bolt 85A to penetrate therethrough.

The U-shaped joint fitting 81 includes the bottom portion 82 having a plate shape, a back portion 83A having a plate shape and bent in the upward direction, and a front portion 83B having a plate shape and bent in the upward direction. The bottom portion 82 of the U-shaped joint fitting 81 is secured to the insulated substrate 10. The back portion 83A and the front portion 83B extend from the bottom portion 82 in the direction perpendicular to the bottom portion 82.

The U-shaped joint fitting 81 also includes the bolt through holes 84B in the bottom portion 82 for each allowing the bolt 85B to penetrate therethrough, and the bolt through hole 84A in each of the back portion 83A and the front portion 83B for allowing the bolt 85A to penetrate therethrough.

Note that the shapes, the arrangement positions, and the arrangement directions of the L-shaped joint fitting 80 and of the U-shaped joint fitting 81 are not limited to the shapes, the arrangement positions, and the arrangement directions illustrated in FIG. 17.

As illustrated in FIGS. 17 and 18, the L-shaped joint fittings 80 and the U-shaped joint fittings 81 are disposed on the insulated substrate 10A to 10C. The bolts 85B penetrate through bolt through holes formed in the insulated substrate 10 and through the bolt through holes 84B formed in the bottom portion 82, and a nut 86B is tightened on each of the bolts 85B from below the corresponding one of the insulated substrates 10A to 10C, whereby the L-shaped joint fittings 80 and the U-shaped joint fittings 81 are each secured to the insulated substrates 10A to 10C.

Note that the method for securing the L-shaped joint fittings 80 and the U-shaped joint fittings 81 is not limited to the foregoing method. For example, the method may be to cut a threaded hole that is to serve as the bolt through hole in the insulated substrate 10, and to screw the bolt 85B directly into the threaded hole without using the nut 86B. In this case, threaded holes to each serve as a bolt through hole may also be formed in the L-shaped joint fittings 80 and the U-shaped joint fittings 81. Thus, tightening the bolts 85B directly to the insulated substrate 10 causes the L-shaped joint fittings 80 and the U-shaped joint fittings 81 to be secured to the insulated substrate 10.

A method for connecting the capacitor 4 and the diode 5 will next be described. Note that the capacitor 4 and the diode 5 are connected in a similar manner. Thus, a method for connecting the diode 5 will herein be described.

The diode 5 is disposed on the insulated substrate 10. A lead-forming process is performed on the leads 9B of the diode 5 to bend the leads 9B toward the bolt through holes 84B provided in the bottom portion 82 of the L-shaped joint fitting 80. The endmost portion of each of the leads 9B that has been bent by lead forming is tucked between the bolt 85B for securing purpose and the L-shaped joint fitting 80. Then, tightening of the nut 86B for securing purpose on the bolt 85B for securing purpose causes the diode 5 to be electrically connected to the L-shaped joint fitting 80.

Note that the direction of bending the leads 9B and the method for securing the leads 9B may be any bending direction and any securing method. For example, the leads 9B may each be secured to the L-shaped joint fitting 80 by being penetrated through the bolt through hole 84A of the L-shaped joint fitting 80, and tightening the nut 86A on the bolt 85A onto the bolt through hole 84A. Alternatively, the leads 9B may also be each secured to the L-shaped joint fitting 80 by attaching a crimp terminal to the endmost portion of the lead 9B, putting the opening of the crimp terminal around the bolt 85A or the bolt 85B, and tightening the bolt 85A or 85B. Note that components are connected to the U-shaped joint fittings 81 in a manner similar to the method for connecting a component to the L-shaped joint fitting 80.

In addition, it is sufficient that the leads 9B of the diode 5 and the leads of the capacitor 4 be connected to at least one of the L-shaped joint fitting 80 and the U-shaped joint fitting 81.

Figure 21:
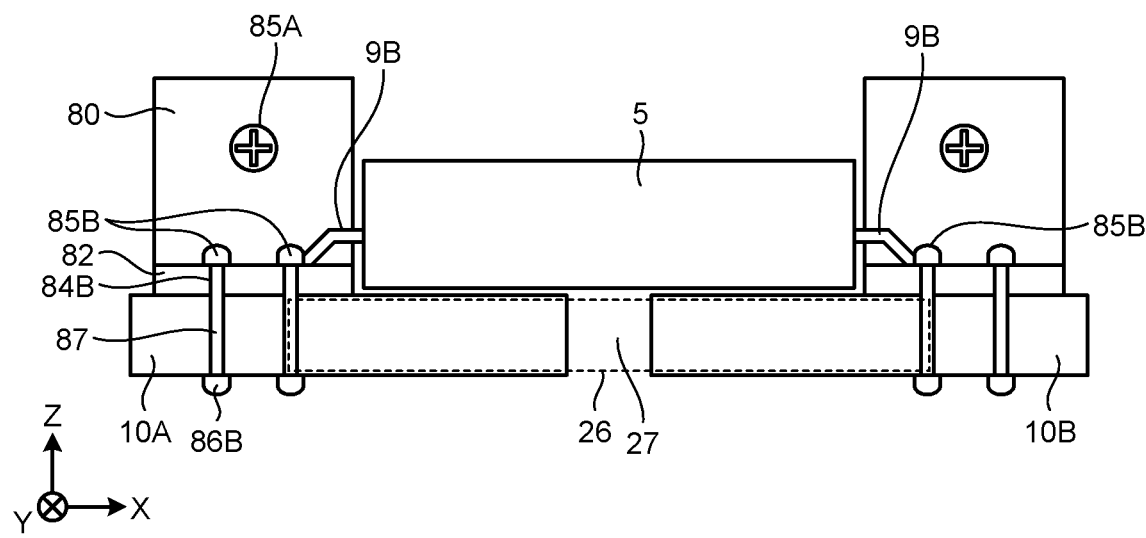
FIG. 21 is a diagram for describing a cross-sectional configuration of a diode in the stage included in the voltage generation device according to the third embodiment, taken along a plane parallel to the XZ plane.

Description will next be made of a problem that may occur when a component is secured on a component-joint fitting using the bolts 85A and 85B. FIG. 21 is a diagram for describing a cross-sectional configuration of the diode in the stage included in the voltage generation device according to the third embodiment, taken along a plane parallel to the XZ plane.

FIG. 21 illustrates a mounting configuration of the diode 5 in the third embodiment. An example will be described below in which the L-shaped joint fittings 80 are secured to the insulated substrates 10A and 10B.

When the L-shaped joint fitting 80 is secured to the insulated substrate 10, the bolts 85B are penetrated through the respective bolt through holes 87 formed in the insulated substrate 10A and through the respective bolt through holes 84B formed in the bottom portion 82 of the L-shaped joint fitting 80, and the nuts 86B are tightened on the bolts 85B from below the insulated substrate 10A.

In a case in which the bolts 85B are electrically conductive, an electric field is generated in a space between the bolts 85B surrounded by a broken-line area 26 of FIG. 21. The broken-line area 26 is an area functioning as a capacitor formed between one of the bolts 85B connected to the insulated substrate 10A and one of the bolts 85B connected to the insulated substrate 10B.

As described in connection with the first embodiment, when a slit 17 for preventing a creeping discharge is provided between a pair of the component connection portions 22, and the slit end portion 18 is positioned right under a component, a partial discharge may easily occur in the slit end portion 18. In the third embodiment, the insulated substrate 10 is divided by the segmenting areas 27 similarly to the first and second embodiments, thereby enabling a partial discharge to be prevented from occurring in the air layer in the broken-line area 26, that is, in the air layer between the bolts 85B even when the component-joint fittings are secured using the bolts 85B.

Thus, in the third embodiment, use of component-joint fittings for joining a component to the insulated substrate 10 eliminates the need for soldering work. In addition, a component can be fixed to the insulated substrate 10 using only the bolts 85B and the nuts 86B; therefore, ease of assembly in producing the device can be improved. Moreover, because the insulated substrate 10 is divided by the segmenting areas 27 similarly to the first and second embodiments, occurrence of a partial discharge in the air layer between the bolts 85B for securing the joint fittings can be prevented.

Fourth Embodiment

A fourth embodiment will next be described with reference to FIGS. 22 to 28. The fourth embodiment will be described with respect to a method for fixing the insulated substrates 10A to 10C produced by division.

Figure 22:
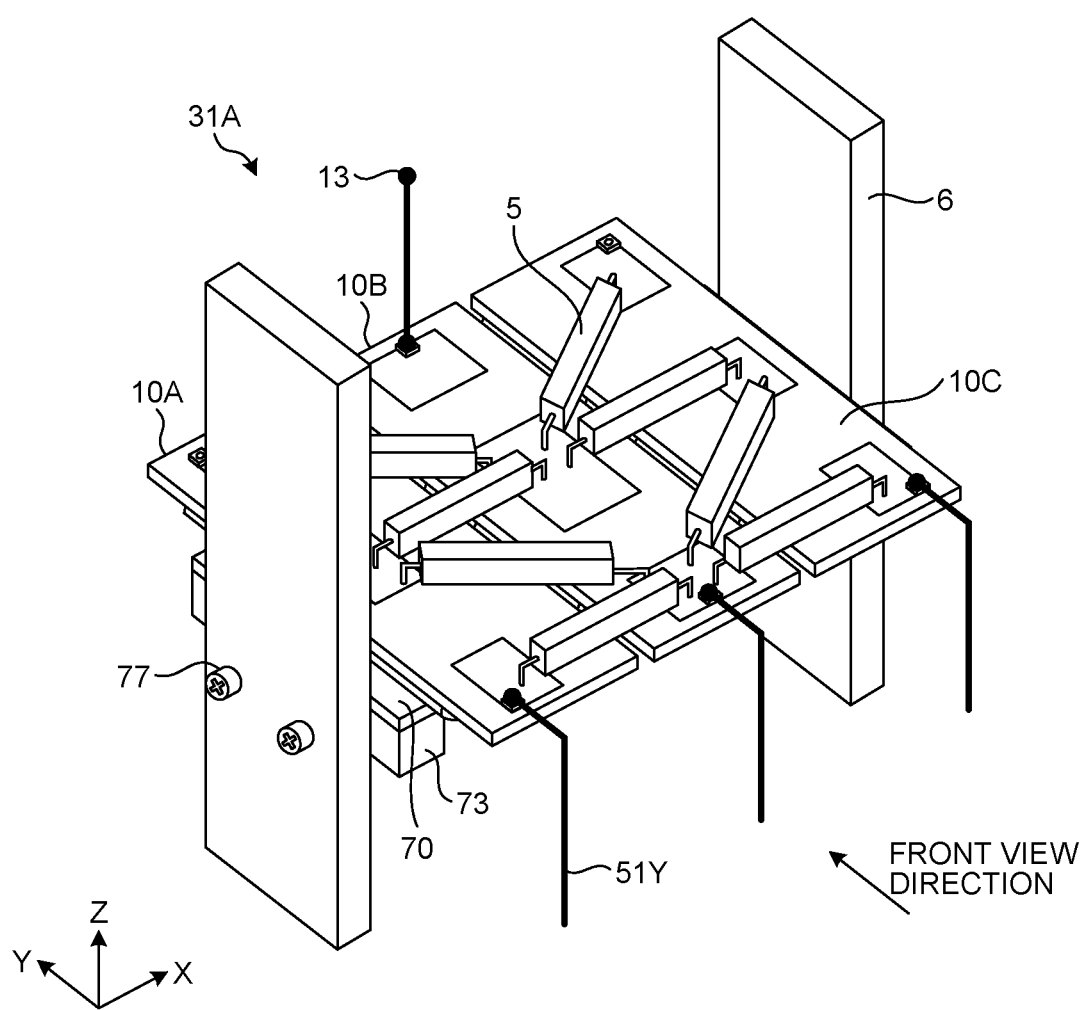
FIG. 22 is a perspective view illustrating a structure of the stage included in a voltage generation device according to a fourth embodiment.
Figure 23:
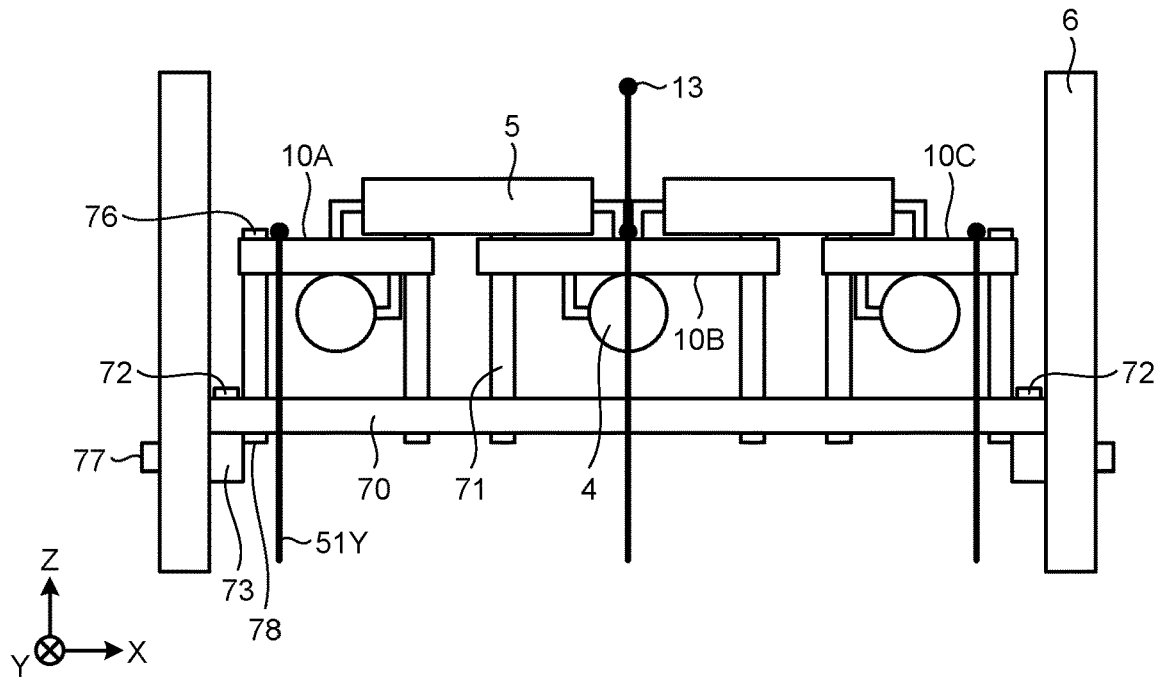
FIG. 23 is a front view illustrating the structure of the stage included in the voltage generation device according to the fourth embodiment.
Figure 24:
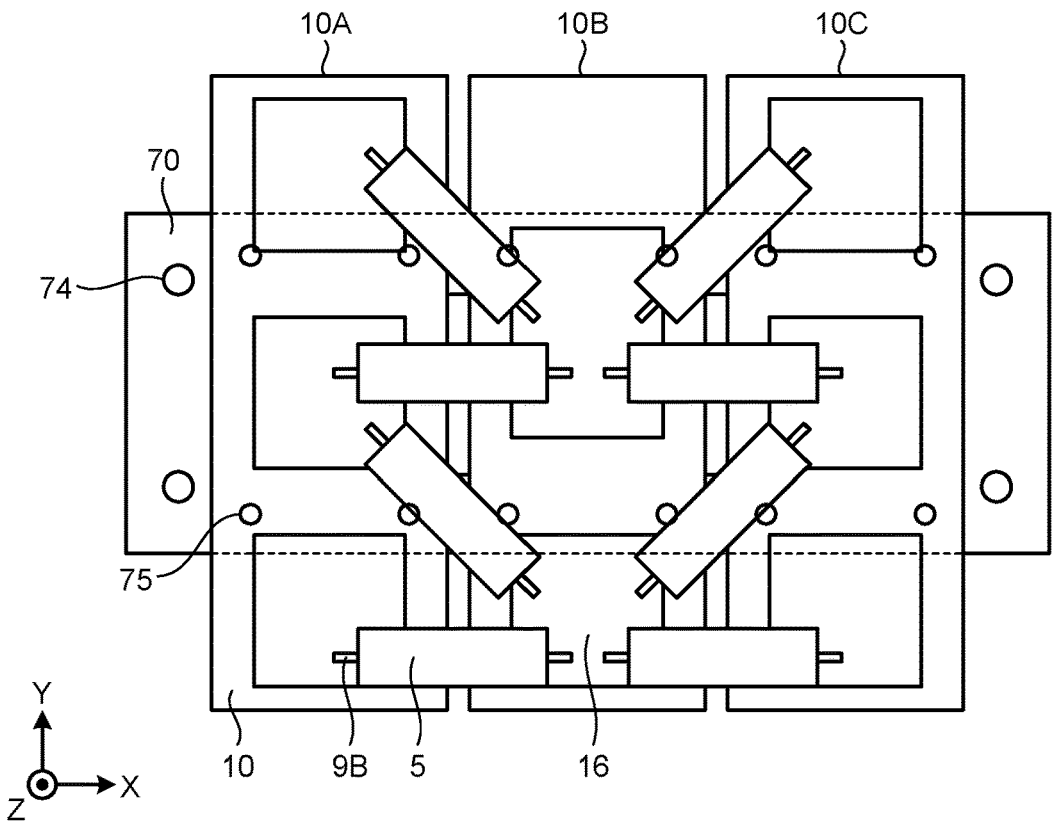
FIG. 24 is a top view illustrating the structure of the stage included in the voltage generation device according to the fourth embodiment.

FIG. 22 is a perspective view illustrating a structure of the stage included in the voltage generation device according to the fourth embodiment. FIG. 23 is a front view illustrating the structure of the stage included in the voltage generation device according to the fourth embodiment. FIG. 24 is a top view illustrating the structure of the stage included in the voltage generation device according to the fourth embodiment.

FIG. 23 illustrates a front view of the stage 31A illustrated in FIG. 22 as viewed from the Y-axis direction, which is the front view direction. FIG. 24 illustrates a top view of the stage 31A illustrated in FIG. 22 as viewed from the Z-axis direction, which is the top view direction.

Note that because the stages 31A to 31C have similar structures, a structure of the stage 31A will next be described. Among the components of FIGS. 22 to 24, components providing functionality identical to the functionality of the stage 31A described in the first through third embodiments are designated by like reference characters, and duplicate description will be omitted.

The voltage generation device 100 includes the stage 31A, the insulation plate 70 serving as a base, fixing rods 73 for fixing the insulation plate 70 to the support rods 6, bolts 72, 76, 77, and 78, and the spacers 71.

The spacers 71 fix the insulated substrates 10A to 10C such that the insulated substrates 10A to 10C are spaced apart from the insulation plate 70. The bolts 72 fix the fixing rods 73 to the insulation plate 70. The bolts 77 fix the support rods 6 and the fixing rods 73 to each other. The bolts 76 fix the spacers 71 and the insulated substrates 10A to 10C to each other. The bolts 78 fix the spacers 71 to the insulation plate 70.

As illustrated in FIG. 24, the spacers 71 are disposed at the positions of bolt holes 75 for securing the spacers, of the insulated substrates 10A to 10C. The upper end portions of the respective spacers 71 are fixed to the insulated substrates 10A to 10C by tightening the bolts 76 from above the insulated substrates 10A to 10C. In addition, the lower end portions of the spacers 71 are fixed to the insulation plate 70 by tightening the bolts 78 from below the insulation plate 70.

Thus, the insulated substrates 10A to 10C are fixed to the insulation plate 70 with the spacers 71 interposed therebetween.

Moreover, the fixing rod 73 is fixed to the support rod 6 by tightening the bolts 77 from the outer side of the support rod 6. In addition, as illustrated in FIG. 24, the fixing rods 73 are disposed at the positions of bolt holes 74 for securing the fixing rods, of the insulation plate 70. The fixing rods 73 are fixed to the insulation plate 70 by tightening the bolts 72 from above the insulation plate 70. Thus, the insulation plate 70 is fixed to the support rods 6 with the fixing rods 73 interposed therebetween.

The above structure allows the insulated substrates 10A to 10C to be disposed above the insulation plate 70 with the spacers 71 each having an adjusted height interposed therebetween. Thus, the voltage generation device 100 can ensure a sufficient creepage distance between each of the support rods 6 at a zero potential and a component, thereby increasing the creepage surface dielectric strength.

Figure 25:
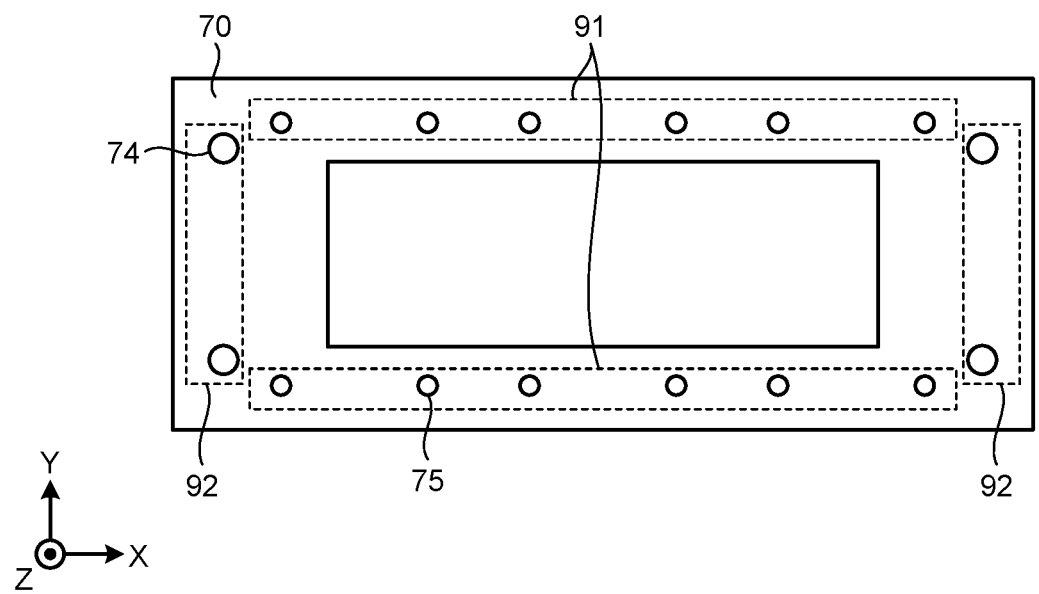
FIG. 25 is a top view illustrating a first example of a structure of the insulation plate included in the voltage generation device according to the fourth embodiment.

A configuration of the insulation plate 70 serving as a base will next be described. FIG. 25 is a top view illustrating a first example of a structure of the insulation plate included in the voltage generation device according to the fourth embodiment. An example will be described below in which a longitudinal direction of the insulation plate 70 having a rectangle upper surface is parallel to the X-axis direction, and a lateral direction of the insulation plate 70 is parallel to the Y-axis direction.

The insulation plate 70 has a rectangular annular shape, that is, has a rectangular-shaped outer periphery and an opening, which is a rectangular hole, in a central area. That is, the insulation plate 70 is rectangular having a rectangular opening therein as viewed from above. In other words, the insulation plate 70 serving as a base only needs to have an opening in a central area. The insulation plate 70 has multiple bolt holes in an outer peripheral portion. Specifically, the bolt holes 74 for fixing the fixing rods 73 are provided in shorter side portions 92 along the shorter sides, of the outer peripheral portion of the insulation plate 70. In addition, the bolt holes 75 for fixing the spacers 71 are provided in longer side portions 91 along the longer sides, of the outer peripheral portion of the insulation plate 70.

Figure 26:
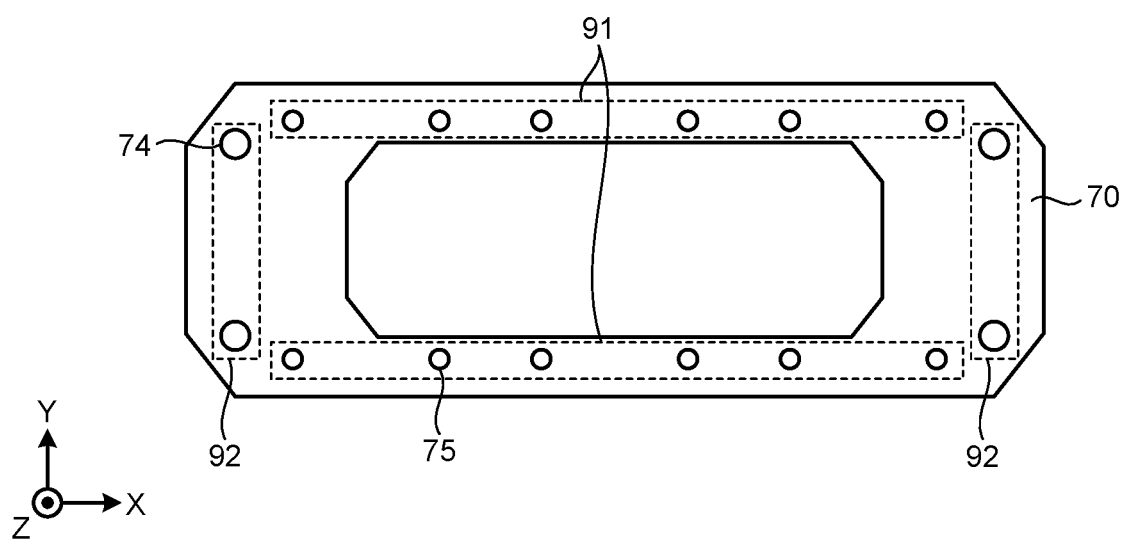
FIG. 26 is a top view illustrating a second example of the structure of the insulation plate included in the voltage generation device according to the fourth embodiment.
Figure 27:
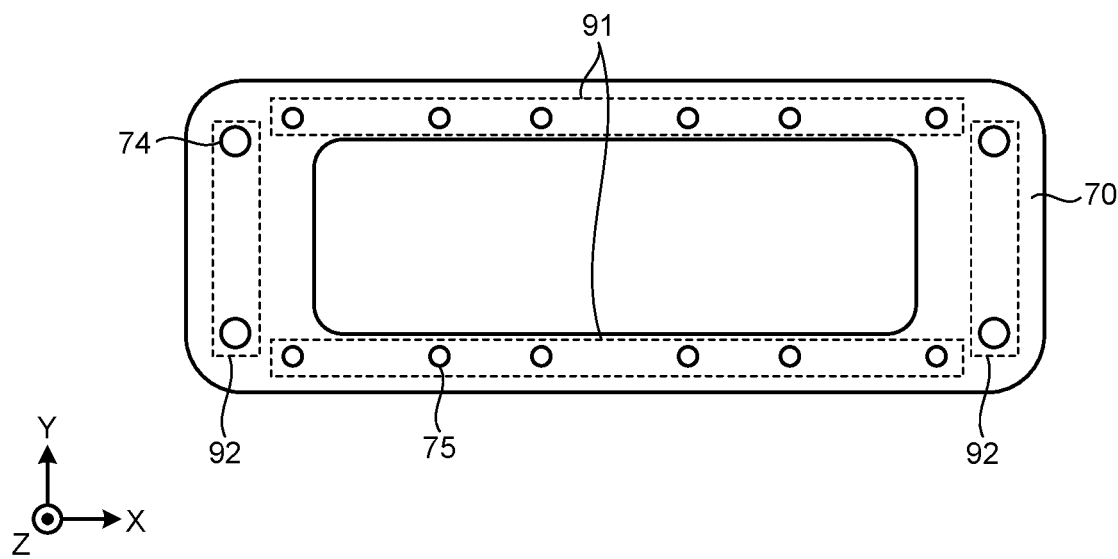
FIG. 27 is a top view illustrating a third example of the structure of the insulation plate included in the voltage generation device according to the fourth embodiment.
Figure 28:
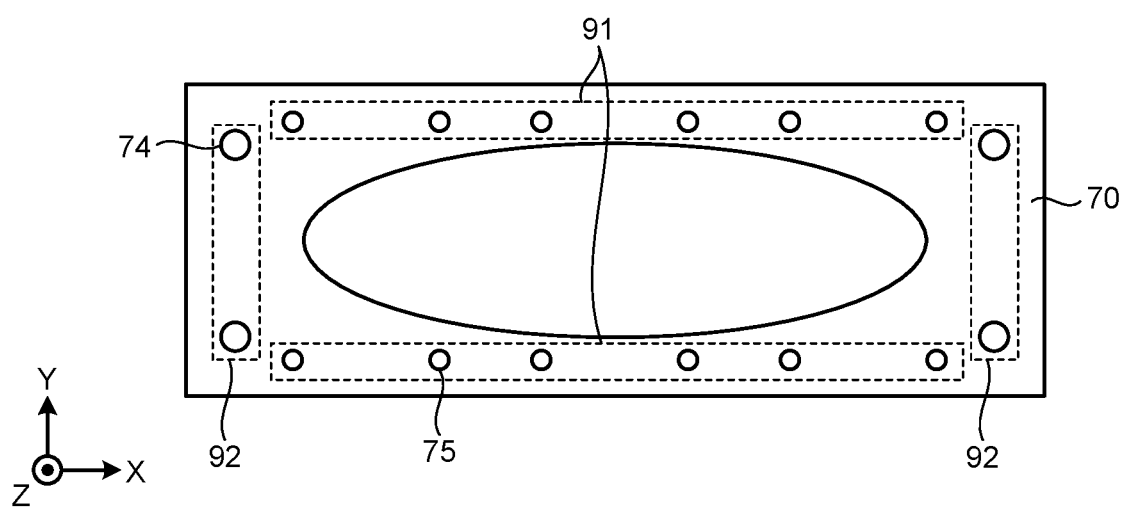
FIG. 28 is a top view illustrating a fourth example of the structure of the insulation plate included in the voltage generation device according to the fourth embodiment.

FIG. 26 is a top view illustrating a second example of the structure of the insulation plate included in the voltage generation device according to the fourth embodiment. FIG. 27 is a top view illustrating a third example of the structure of the insulation plate included in the voltage generation device according to the fourth embodiment. FIG. 28 is a top view illustrating a fourth example of the structure of the insulation plate included in the voltage generation device according to the fourth embodiment.

The insulation plate 70 may have, as illustrated in FIG. 26, an outer peripheral shape of an octagon. The insulation plate 70 may also have, as illustrated in FIG. 27, an outer peripheral shape of a rectangle with rounded corners.

In addition, the insulation plate 70 may have, as illustrated in FIG. 26, an opening having an octagonal shape. The insulation plate 70 may also have, as illustrated in FIG. 27, an opening having a shape of a rectangle with rounded corners. The insulation plate 70 may otherwise have, as illustrated in FIG. 28, an opening having an elliptical shape.

The fixing rods 73 are placed under the bolt holes 74 provided in the shorter side portions 92, on the bottom surface side of the insulation plate 70, and tightening the bolts 72 from above the insulation plate 70 causes the fixing rods 73 to be fixed to the insulation plate 70.

The spacers 71 are placed above the bolt holes 75 provided in the longer side portions 91, on the upper surface side of the insulation plate 70, and tightening the bolts 78 from below the insulation plate 70 causes the spacers 71 to be fixed to the insulation plate 70.

After fixation of the insulated substrates 10 to the insulation plate 70, components such as the diodes 5 and the capacitors 4 are mounted on the insulated substrates 10A to 10C.

Thus, according to the fourth embodiment, components are mounted on the insulated substrates 10 after the insulated substrates 10 are fixed to the insulation plate 70 in the assembly work of the insulated substrates 10, thereby enabling components to be mounted while the insulation plate 70 and the insulated substrates 10 are in a stable condition, thereby improving ease of assembly.

In addition, the insulation plate 70 serving as a base has a central area having an opening, which facilitates soldering work and/or bolting work of components onto the bottom surfaces of the insulated substrates 10.

Moreover, the insulated substrates 10 that mount components are fixed onto the insulation plate 70 with the spacers 71 interposed therebetween; therefore, a sufficient creepage distance can be ensured, and the creepage surface dielectric strength can also be increased. In addition, ease of component mounting is improved.

Fifth Embodiment

A fifth embodiment will next be described with reference to FIGS. 29 to 35. In the first embodiment, the diodes 5 are disposed to cross the insulated substrates 10A to 10C produced by division into multiple parts, thereby providing an advantage in increasing dielectric strength along the creepage direction. In addition, in the second embodiment, the insulated substrates 10A to 10C are arranged such that adjacent ones of the insulated substrates 10A to 10C are not at the same height. This increases the width of the air layer 21y between the leads 9B of each applicable one of components, thereby providing an advantage in increasing dielectric strength along the creepage direction.

However, the voltage becomes higher as approaching the end output portion 13 of the CW circuit 1, which is a boost circuit. For example, when an acute angle is formed in a lead-forming portion (i.e., a lead-forming portion 132 described later) or in an end portion (i.e., an end portion 133 described later) of each of the electrically-conductive patterns 16, in each of high-voltage portions (high-voltage portions 131A to 131D described later) nearest to the end output portion 13, densely-spaced lines of electric force causes a high electric field. Even when the insulated substrate 10 is divided into multiple parts, and then the insulated substrates 10A to 10C produced by the division are sufficiently spaced apart from each other, a high electric field may make the dielectric strength along the creepage direction insufficient.

Thus, in the fifth embodiment, the lead-forming portion 132 and the electrically-conductive patterns 16 that are likely to form an acute angle in each of the high-voltage portions 131A to 131D are covered with an insulator (dielectric) to reduce the electric field to increase the creepage surface dielectric strength without increasing the size of the voltage generation device 100. When a high electric field portion having densely-spaced lines of electric force is covered with a dielectric, the distribution of lines of electric force changes due to the insulator and the concentration of the lines of electric force is lessened from higher to lower, thereby reducing the electric field. In addition, the insulator acts as an obstruction, which also reduces the possibility of occurrence of a discharge between two points that are discharge candidates. Note that the following description is provided with respect to a case in which portions likely to form an acute angle in the high-voltage portions 131A to 131D are covered with an insulator, but a portion forming a right angle may also be covered with an insulator. That is, a portion forming an acute angle described below may include a portion forming a right angle.

Figure 29:
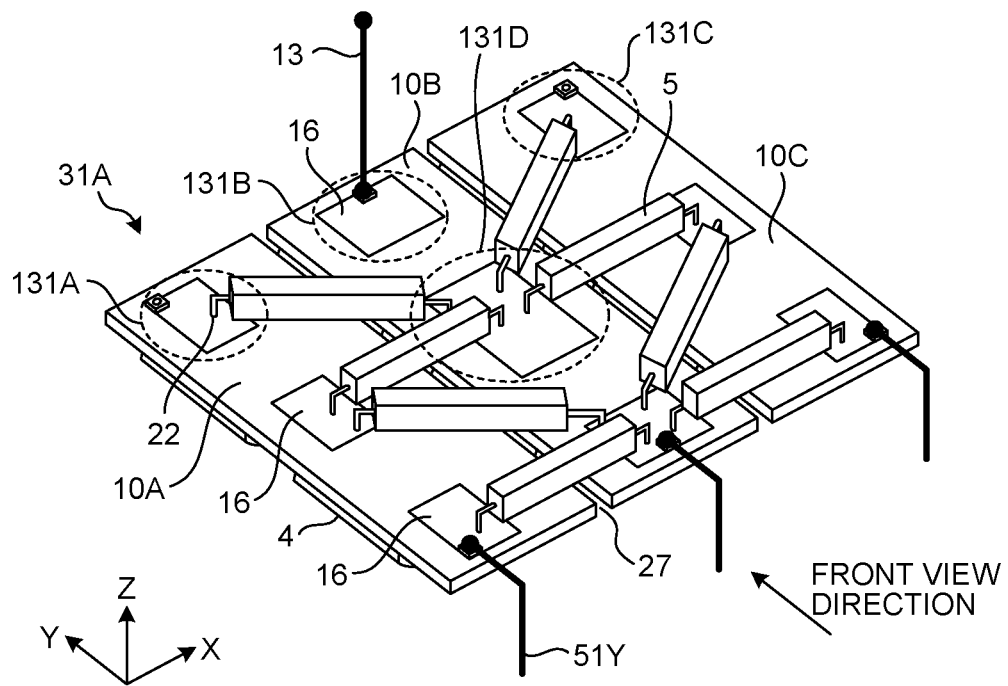
FIG. 29 is a perspective view illustrating a structure of the stage included in a voltage generation device according to a fifth embodiment.

FIG. 29 is a perspective view illustrating a structure of the stage included in the voltage generation device according to the fifth embodiment. In addition, FIG. 30 is a diagram for describing a high electric field portion in the stage included in the voltage generation device according to the fifth embodiment.

Figure 30:
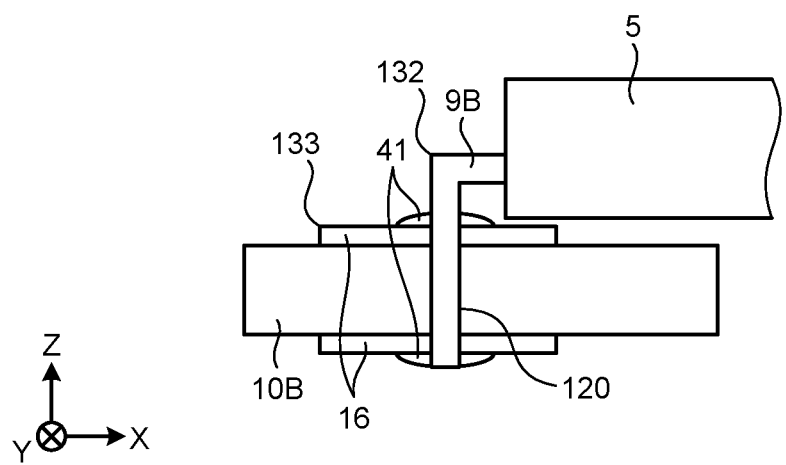
FIG. 30 is a diagram for describing a portion having a high electric field in the stage included in the voltage generation device according to the fifth embodiment.

Among the components of FIGS. 29 and 30, components providing functionality identical to the functionality of the stages 31A to 31C described in the first through fourth embodiments are designated by like reference characters, and duplicate description will be omitted. Note that because the stages 31A to 31C have similar structures also in the fifth embodiment, a structure of the stage 31A will next be described.

FIG. 29 illustrates a structure of the stage 31A, which is a structure of one stage. The stage 31A includes the insulated substrates 10A to 10C, the capacitors 4, and the diodes 5. An example of each of the insulated substrates 10A to 10C is a printed board.

FIG. 29 illustrates an example in which multiple capacitors 4 and multiple diodes 5 are disposed on the insulated substrates 10A to 10C. In FIG. 29, the portions surrounded by a broken line are the high-voltage portions 131A to 131D in the stage 31A. The high-voltage portion 131D has a lower voltage than the voltage in the high-voltage portions 131A to 131C, but the fifth embodiment also treats the high-voltage portion 131D as a high-voltage portion.

FIG. 30 schematically illustrates a cross-sectional configuration of the stage 31A included in the voltage generation device 100 according to the fifth embodiment, taken along a plane parallel to the XZ plane. FIG. 30 illustrates a cross-sectional configuration of a part (an area including the high-voltage portion 131D) of the insulated substrate 10B.

In the fifth embodiment, the lead-forming portion 132 of one of the leads 9B and the end portion 133 of the electrically-conductive pattern 16 are each a high electric field portion forming an acute angle. In addition, although not illustrated in FIG. 30, the lead-forming portions of the leads 9A, and the electrically-conductive patterns 16 to which the leads 9A are connected, on the bottom surface side of the insulated substrates 10A to 10C, are also each a high electric field portion forming an acute angle. The lead-forming portions of the leads 9A are the bent portions of the leads 9A illustrated in FIG. 4. The leads 9A are each a first lead, and the leads 9B are each a second lead. In addition, the lead-forming portion of each of the leads 9A is a first lead-forming portion, and the lead-forming portion 132 of each of the leads 9B is a second lead-forming portion.

On the insulated substrates 10A to 10C, the portions forming an acute angle are molded with a dielectric such as, for example, a resin to cover the foregoing acute angle portions. In the fifth embodiment, it is sufficient that at least one of the lead-forming portion 132 of each of the leads 9A and 9B and the end portion 133 of each of the electrically-conductive patterns 16 be covered with a dielectric such as a resin. FIGS. 29 and 30 do not illustrate the dielectric covering the acute angle portions. Specific examples of the dielectric for covering an acute angle portion will next be described.

Figure 31:
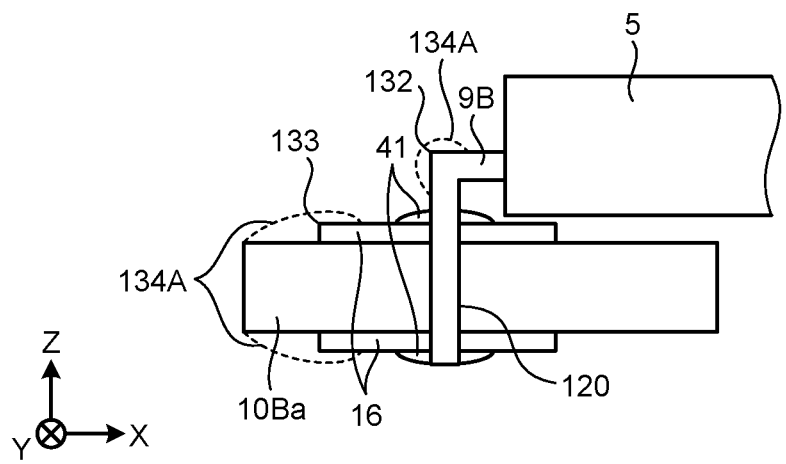
FIG. 31 is a diagram illustrating a first cross-sectional configuration of the stage included in the voltage generation device according to the fifth embodiment, taken along a plane parallel to the XZ plane.

A first example of the dielectric for covering an acute angle portion of the fifth embodiment will first be described. FIG. 31 is a diagram illustrating a first cross-sectional configuration of the stage included in the voltage generation device according to the fifth embodiment, taken along a plane parallel to the XZ plane. FIG. 31 illustrates a cross-sectional configuration of an insulated substrate 10Ba, which illustrates a dielectric of the first example together with the insulated substrate 10B illustrated in FIG. 30.

On the insulated substrate 10Ba, the lead-forming portion 132 and the end portions 133 of the electrically-conductive patterns 16 are each the high electric field portion forming an acute angle. Similarly, the lead-forming portion 132 and the end portions 133 of the electrically-conductive patterns 16 of the other insulated substrates included in the stage 31A are each the high electric field portion forming an acute angle. In the first example of dielectric molding in the fifth embodiment, a resin 134A for use as the dielectric is applied to cover these acute angle portions. FIG. 31 illustrates a situation in which the resin 134A has been individually applied to the lead-forming portion 132, to the end portion 133 of the electrically-conductive pattern 16 on the upper surface, and to the end portion 133 of the electrically-conductive pattern 16 on the bottom surface.

Figure 32:
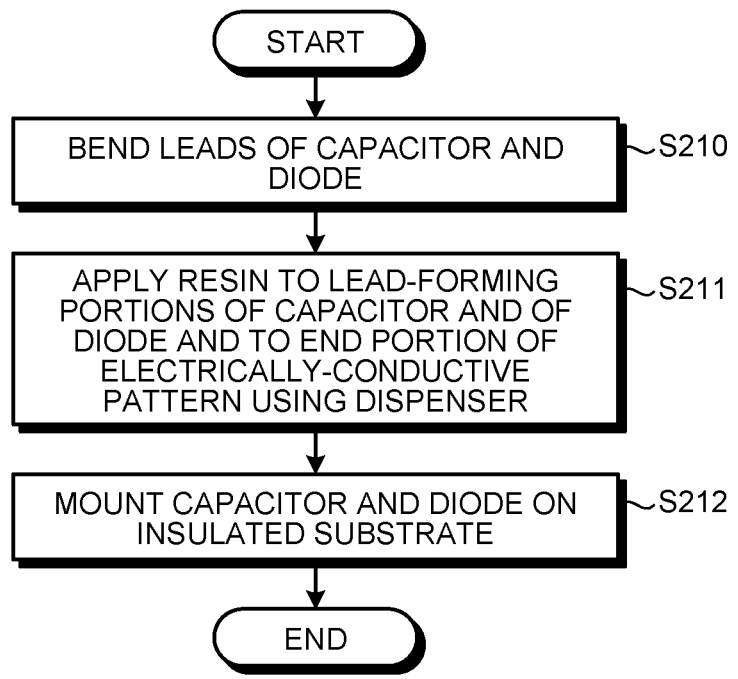
FIG. 32 is a flowchart illustrating a manufacturing procedure for manufacturing the voltage generation device according to the fifth embodiment using the dielectric in the first example.

FIG. 32 is a flowchart illustrating a manufacturing procedure for manufacturing the voltage generation device according to the fifth embodiment using the dielectric in the first example. A method for forming the resin 134A will next be described.

To form a resin 134A over each of the lead-forming portion 132 and the end portions 133 of the electrically-conductive patterns 16, the leads 9A and 9B of the capacitor 4 and of the diode 5 are bent (step S210). This forms the lead-forming portion 132 in each of the leads 9A and 9B. The resin 134A is applied, using a dispenser, to the lead-forming portion 132 of each of the capacitor 4 and the diode 5 and to the end portions 133 of the electrically-conductive patterns 16 (step S211). Thus, the lead-forming portion 132 of the capacitor 4, the lead-forming portion 132 of the diode 5, and the end portions 133 of the electrically-conductive patterns 16 are covered with the resin 134A, which is a dielectric.

The capacitor 4 and the diode 5 having the resin 134A applied thereto are mounted on the insulated substrate 10 (step S212). Specifically, one end of each of the leads 9A and 9B is penetrated through the through-hole 120, and is soldered with solder 41 onto the electrically-conductive pattern 16 on each of the upper surface and the bottom surface of the insulated substrate 10.

The set of these steps enables a reduction in the electric field in and around the lead-forming portion 132 of each of the capacitor 4 and the diode 5, and thus enables an improvement in the dielectric strength along the creepage direction between the leads 9A of a component, and the dielectric strength along the creepage direction between the leads 9B of a component. It is also possible to improve the dielectric strength along the creepage direction in the end portions 133 of the electrically-conductive patterns 16.

Note that it is sufficient that the resin 134A to be applied using a dispenser be solid at a normal temperature. Examples of the resin 134A include silicon resins, polyimide resins, and acrylic resins. It is also sufficient that the applied resin 134A cover the lead-forming portion 132 and the end portions 133 of the electrically-conductive patterns 16. A greater thickness of the resin 134A provides a greater effect of electric field reduction.

The foregoing method for applying the resin 134A using a dispenser has been provided merely by way of example. For example, the resin 134A may be sprayed using a resin spray, or a resin tape may be wrapped. In addition, the resin 134A may be applied to both the lead-forming portion 132 and the end portion 133, or may be applied to only one of these.

Figure 33:
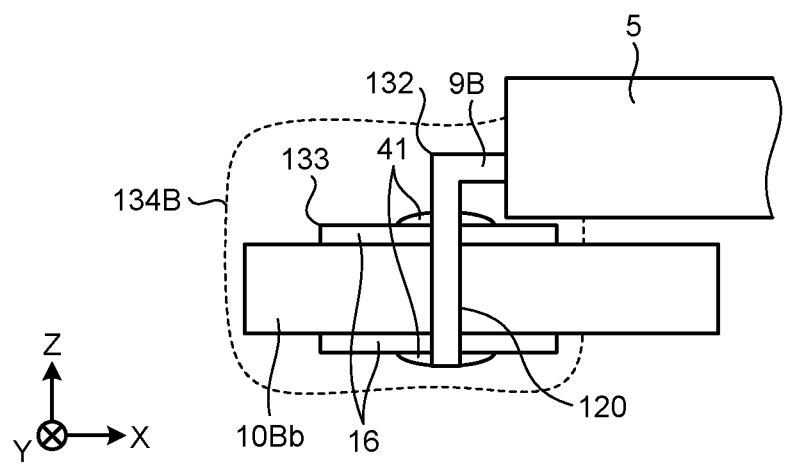
FIG. 33 is a diagram illustrating a second cross-sectional configuration of the stage included in the voltage generation device according to the fifth embodiment, taken along a plane parallel to the XZ plane.

A second example of the dielectric for covering an acute angle portion of the fifth embodiment will next be described. FIG. 33 is a diagram illustrating a second cross-sectional configuration of the stage included in the voltage generation device according to the fifth embodiment, taken along a plane parallel to the XZ plane. FIG. 33 illustrates a cross-sectional configuration of an insulated substrate 10Bb, which illustrates a dielectric of the second example together with the insulated substrate 10B illustrated in FIG. 30.

As described above, on and around the insulated substrate included in the stage 31A (the insulated substrate 10Bb in this example), the lead-forming portion 132 and the end portions 133 of the electrically-conductive patterns 16 are each the high electric field portion forming an acute angle. In the second example of dielectric molding in the fifth embodiment, a resin 134B is applied as the dielectric to collectively cover these acute angle portions.

Specifically, regarding the diode 5 on the insulated substrate 10Bb, the resin 134B is applied to collectively cover the end portion of the diode 5 nearer to the lead-forming portion 132, the end portion of the insulated substrate 10Bb nearer to the lead-forming portion 132, the lead 9B, the solder 41, and the electrically-conductive patterns 16. Similarly, regarding the capacitor 4 (not illustrated in FIG. 33) on the insulated substrate 10Bb, the resin 134B is also applied to collectively cover the end portion of the insulated substrate 10Bb nearer to the lead-forming portion 132, the lead 9A, the solder 41, and the electrically-conductive patterns 16. Thus, the lead-forming portion 132 and the end portions 133 of the electrically-conductive patterns 16, which each form an acute angle, are molded by the resin 134B.

Figure 34:
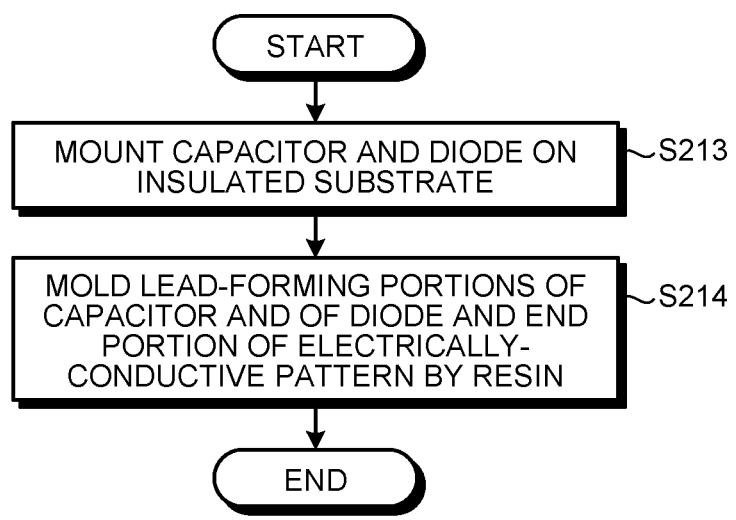
FIG. 34 is a flowchart illustrating a manufacturing procedure for manufacturing the voltage generation device according to the fifth embodiment using the dielectric in the second example.

FIG. 34 is a flowchart illustrating a manufacturing procedure for manufacturing the voltage generation device according to the fifth embodiment using the dielectric in the second example. A method for forming a resin 134B will next be described.

To form a resin 134B collectively over the lead-forming portion 132 and over the end portions 133 of the electrically-conductive patterns 16, the capacitor 4 and the diode 5 are mounted on the insulated substrate 10 (step S213). Specifically, one end of each of the leads 9A and 9B is penetrated through the through-hole 120, and is soldered with the solder 41 onto the electrically-conductive pattern 16 on each of the upper surface and the bottom surface of the insulated substrate 10. Note that the leads 9A and 9B have been bent when the capacitor 4 and the diode 5 are mounted on the insulated substrate 10.

Then, the lead-forming portion 132 of each of the capacitor 4 and the diode 5 and the end portions 133 of corresponding ones of the electrically-conductive patterns 16 are molded together by the resin 134B (step S214).

Examples of the material used for molding include silicon, epoxies, and polyamides and polyesters that are hot-melt adhesives. One molding method is, for example, a hot-melt process, which is low-pressure molding causing insignificant or no damage to the insulated substrate 10 or to a component, and allows use of an aluminum mold. In a hot-melt process, the leads 9A and 9B of the capacitor 4 and of the diode 5 are bent, and the capacitor 4 and the diode 5 are mounted on the insulated substrate 10, and are then molded.

Note that the molding method described with reference to FIGS. 33 and 34 has been provided merely by way of example, and the molding method is not limited to this example. Various molding methods are applicable in terms of the material, the mold, and the forming method. That is, the process of molding together, by the resin 134B, the lead-forming portion 132 and the end portions 133 of the electrically-conductive patterns 16 has the purpose of covering the high electric field portions with a dielectric such as the resin 134B; application of any molding condition can reduce the electric field.

Figure 35:
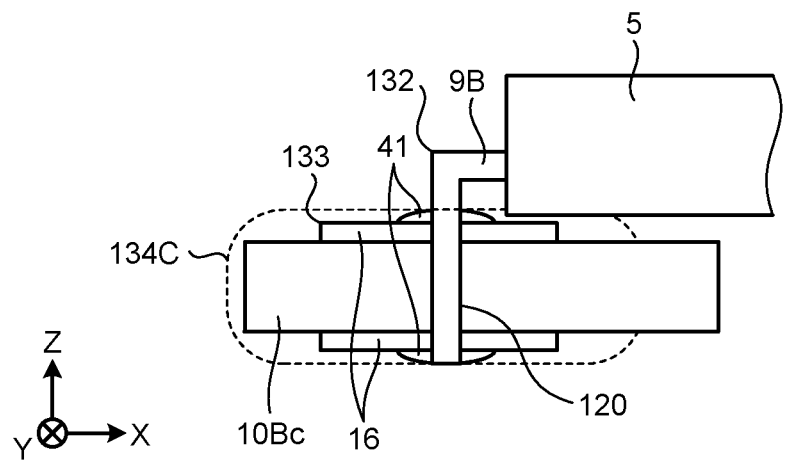
FIG. 35 is a diagram illustrating a third cross-sectional configuration of the stage included in the voltage generation device according to the fifth embodiment, taken along a plane parallel to the XZ plane.

A third example of the dielectric for covering an acute angle portion of the fifth embodiment will next be described. FIG. 35 is a diagram illustrating a third cross-sectional configuration of the stage included in the voltage generation device according to the fifth embodiment, taken along a plane parallel to the XZ plane. FIG. 35 illustrates a cross-sectional configuration of an insulated substrate 10Bc, which illustrates a dielectric of the third example together with the insulated substrate 10B illustrated in FIG. 30.

In the third example of dielectric molding in the fifth embodiment, a resin coating material such as HumiSeal is applied to the end portions 133 of the electrically-conductive patterns 16. Examples of the method for application of a resin coating material include methods such as brush application, hot-dip galvanization (dipping), spaying, and application using an application device.

As described above, on the insulated substrate included in the stage 31A (the insulated substrate 10Bc in this example), the end portions 133 of the electrically-conductive patterns 16 are each the high electric field portion forming an acute angle. In the third example of dielectric molding, a resin (resin coating material) 134C is applied as the dielectric such as HumiSeal to cover the end portions 133 of the electrically-conductive patterns 16, which are these acute angle portions.

FIG. 35 illustrates a situation in which the resin 134C is applied collectively to the electrically-conductive pattern 16 provided on the upper surface and to the electrically-conductive pattern 16 provided on the bottom surface, of the insulated substrate 10Bc.

Among application methods of brush application, dipping, spraying, and application using an application device, application using an application device is an application method providing high productivity and high quality finish without causing a variation in quality. Nevertheless, the purpose is to mask the high electric field portions, and any of these methods allows a reduction in the electric field.

Note that the resin treatment process described in the fifth embodiment is by way of example. Thus, the resin treatment portions are not limited to the high-voltage portions 131A to 131D nearest to the end output portion 13, but what is needed is to perform resin treatment on necessary portions. In the fifth embodiment, resin treatment is performed on the insulated substrates 10A to 10C produced by division into multiple parts, which is advantageous in applicability of local treatment such as molding.

Thus, in the fifth embodiment, the lead-forming portion 132 of each of the capacitor 4 and the diode 5 and the end portion 133 of each of the electrically-conductive patterns 16 are covered with one of the resins 134A to 134C. This enables a reduction in the electric field in and around the lead-forming portion 132 of each of the capacitor 4 and the diode 5, and also a reduction in the electric field in and around the end portion 133 of each of the electrically-conductive patterns 16. Thus, it is possible to improve the dielectric strength along the creepage direction between the leads 9A of a component, the dielectric strength along the creepage direction between the leads 9B of a component, and the dielectric strength along the creepage direction in the end portion 133 of each of the electrically-conductive patterns 16.

Sixth Embodiment

A sixth embodiment will next be described with reference to FIGS. 36 to 41. In the sixth embodiment, high electric field portions in the stage 31A of the third embodiment are covered with an insulator (dielectric) similarly to the fifth embodiment.

In the sixth embodiment, the electric field is reduced in and around the high electric field portion by covering with an insulator the outer edge portion of each of the component-joint fittings and the nuts 86A, which are each likely to be a high-voltage portion and to form an acute angle to increase the creepage surface dielectric strength without increasing the size of the voltage generation device 100. When a high electric field portion having densely-spaced lines of electric force is covered with a dielectric, the distribution of lines of electric force changes due to the dielectric and the concentration of the lines of electric force is lessened from higher to lower, thereby reducing the electric field. In addition, the insulator acts as an obstruction, which also reduces the possibility of occurrence of a discharge between two points that are discharge candidates.

Figure 36:
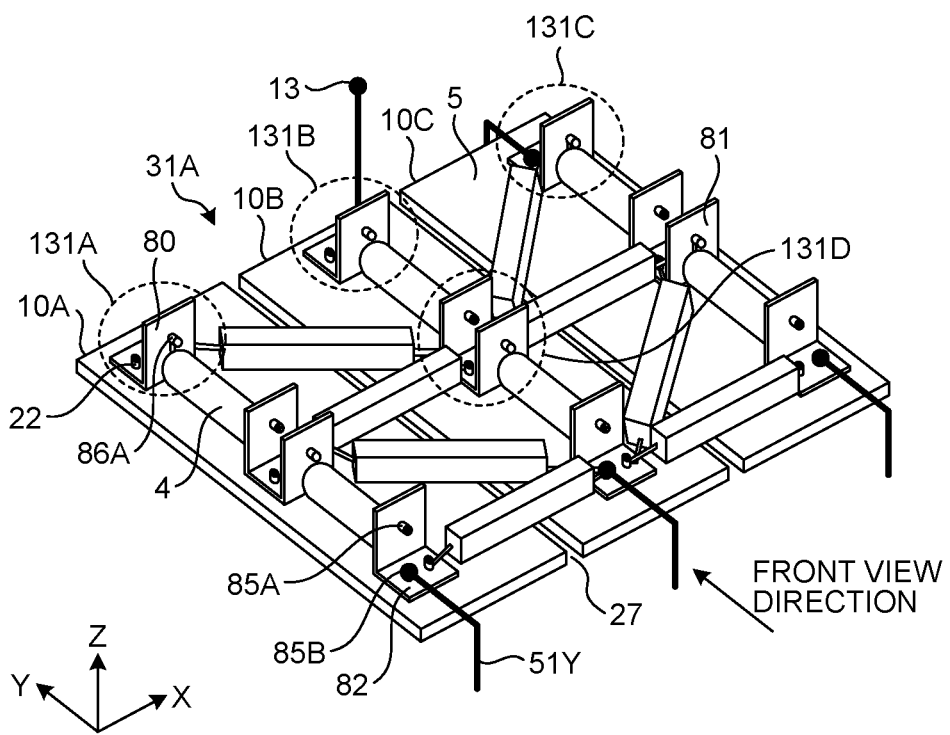
FIG. 36 is a perspective view illustrating a structure of the stage included in a voltage generation device according to a sixth embodiment.

FIG. 36 is a perspective view illustrating a structure of the stage included in the voltage generation device according to the sixth embodiment. In addition, FIG. 37 is a diagram for describing a high electric field portion in the stage included in the voltage generation device according to the sixth embodiment.

Figure 37:
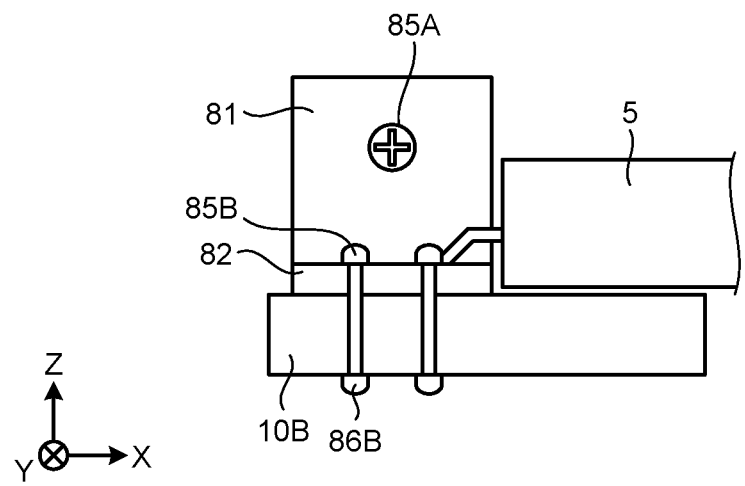
FIG. 37 is a diagram for describing a portion having a high electric field in the stage included in the voltage generation device according to the sixth embodiment.

Among the components of FIGS. 36 and 37, components providing functionality identical to the functionality of the stages 31A to 31C described in the first through fourth embodiments are designated by like reference characters, and duplicate description will be omitted. Note that because the stages 31A to 31C have similar structures also in the sixth embodiment, a structure of the stage 31A will next be described. FIG. 37 illustrates a cross-sectional configuration of the stage 31A included in the voltage generation device 100 according to the sixth embodiment, taken along a plane parallel to the XZ plane.

FIG. 36 illustrates a structure of the stage 31A, which is a structure of one stage. FIG. 37 schematically illustrates a cross-sectional configuration of a part (an area including the high-voltage portion 131D) of the insulated substrate 10B. FIG. 36 illustrates an example in which multiple capacitors 4 and multiple diodes 5 are disposed on the insulated substrates 10A to 10C. In FIG. 36, the portions surrounded by a broken line are the high-voltage portions 131A to 131D in the stage 31A.

Figure 38:
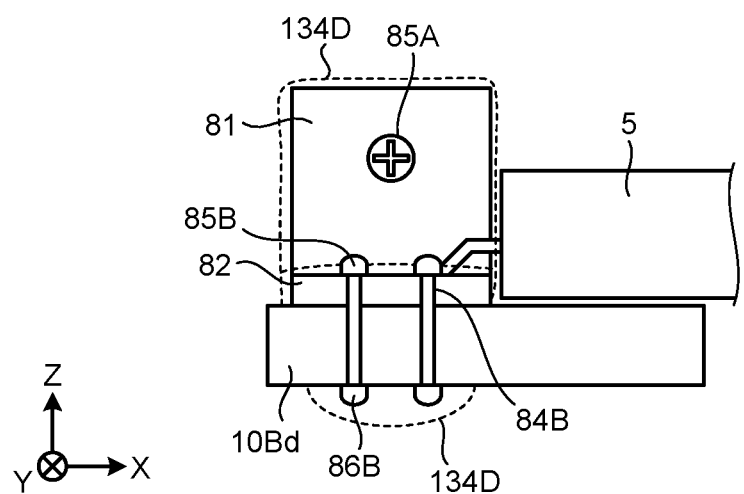
FIG. 38 is a diagram illustrating a first cross-sectional configuration of the stage included in the voltage generation device according to the sixth embodiment, taken along a plane parallel to the XZ plane.

A first example of the dielectric for covering an acute angle portion of the sixth embodiment will first be described. FIG. 38 is a diagram illustrating a first cross-sectional configuration of the stage included in the voltage generation device according to the sixth embodiment, taken along a plane parallel to the XZ plane. FIG. 38 illustrates a cross-sectional configuration of an insulated substrate 10Bd, which illustrates a dielectric of the first example together with the insulated substrate 10B illustrated in FIG. 37.

On the insulated substrate 10Bd, the outer edge portion of the component-joint fitting such as the L-shaped joint fitting 80 (not illustrated in FIG. 38) or the U-shaped joint fitting 81, and the nuts 86B, are each the high electric field portion forming an acute angle. Similarly, the outer edge portion of each of the component-joint fittings and the nuts 86B of the other insulated substrates included in the stage 31A are each the high electric field portion forming an acute angle. The outer edge portion of a component-joint fitting refers to all outer edge portions including the outer edge portion of the plate-shaped member extending in the Z-axis direction and the outer edge portion of the plate-shaped member extending in the Y-axis direction, of the plate-shaped members included in that component-joint fitting.

Among the component-joint fittings, component-joint fittings connected to the leads 9A of the capacitor 4 are each a first component-joint fitting. Among the component-joint fittings, component-joint fittings connected to the leads 9B of the diode 5 are each a second component-joint fitting. FIG. 38 illustrates the U-shaped joint fitting 81 as one of the component-joint fittings connected to the leads 9B, and illustrates no component-joint fittings connected to the leads 9A. In the first example of dielectric molding in the sixth embodiment, a resin 134D is applied as the dielectric to cover the acute angle portions described above. FIG. 38 illustrates a situation in which the resin 134D has been individually applied to the outer edge portion of the component-joint fitting and to a set of the nuts 86B.

Figure 39:
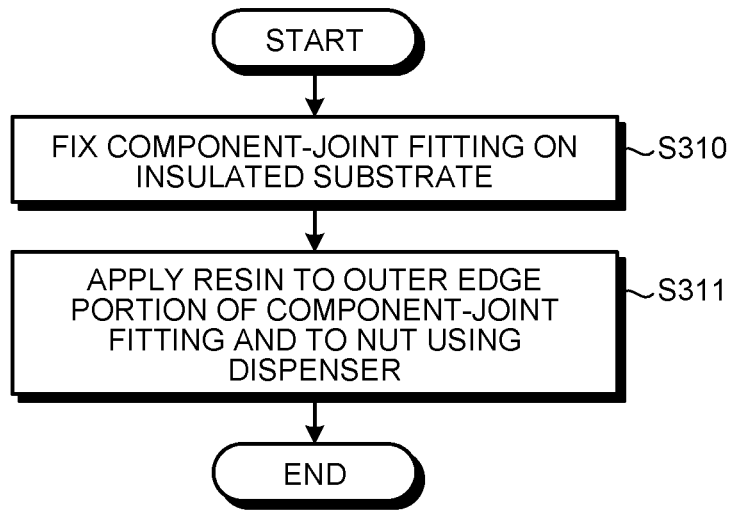
FIG. 39 is a flowchart illustrating a manufacturing procedure for manufacturing the voltage generation device according to the sixth embodiment using the dielectric in the first example.

FIG. 39 is a flowchart illustrating a manufacturing procedure for manufacturing the voltage generation device according to the sixth embodiment using the dielectric in the first example. A method for forming a resin 134D will next be described.

To form a resin 134D over the outer edge portion of the component-joint fitting and over the nuts 86B, the component-joint fitting is fixed on the insulated substrate 10 by the nuts 86B (step S310). Specifically, the bolts 85B are penetrated through corresponding ones of the bolt through holes 87 formed in the insulated substrate 10 and through the bolt through holes 84B formed in the bottom portion 82, and tightening the nuts 86B on the bolts 85B from below the insulated substrate 10 causes the component-joint fitting to be secured to the insulated substrate 10.

The resin 134D is then applied to the outer edge portion of the component-joint fitting and to the nuts 86B using a dispenser (step S311). Thus, the outer edge portion of the component-joint fitting and the nuts 86B are covered with the resin 134D, which is a dielectric.

Note that it is sufficient that the resin 134D to be applied using a dispenser be solid at a normal temperature. Examples of the resin 134D include silicon resins, polyimide resins, and acrylic resins. It is also sufficient that the applied resin 134D cover the outer edge portion of the component-joint fitting and the nuts 86B, and the resin 134D may have a small thickness.

The foregoing method for applying the resin 134D using a dispenser has been provided merely by way of example. For example, the resin 134D may be sprayed using a resin spray, or a resin tape may be wrapped. In addition, the resin 134D may be applied to both the outer edge portion of the component-joint fitting and the set of the nuts 86B, or may be applied to only one of these.

Figure 40:
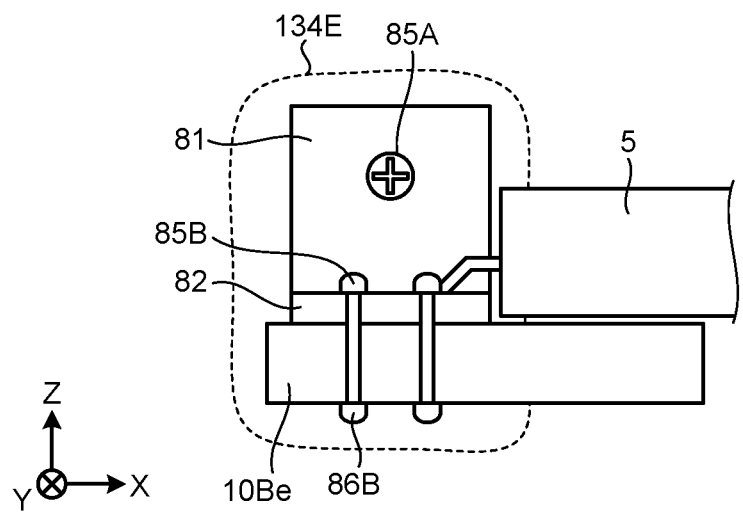
FIG. 40 is a diagram illustrating a second cross-sectional configuration of the stage included in the voltage generation device according to the sixth embodiment, taken along a plane parallel to the XZ plane.

A second example of the dielectric for covering an acute angle portion of the sixth embodiment will next be described. FIG. 40 is a diagram illustrating a second cross-sectional configuration of the stage included in the voltage generation device according to the sixth embodiment, taken along a plane parallel to the XZ plane. FIG. 40 illustrates a cross-sectional configuration of an insulated substrate 10Be, which illustrates a dielectric of the second example and the insulated substrate 10B illustrated in FIG. 37.

As described above, on and around the insulated substrate included in the stage 31A (the insulated substrate 10Be in this example), the outer edge portion of the component-joint fitting and the nuts 86B are each the high electric field portion forming an acute angle. In the second example of dielectric molding in the sixth embodiment, a resin 134E is applied to collectively cover these acute angle portions.

Specifically, regarding the diode 5 on the insulated substrate 10Be, the resin 134E is applied to collectively cover the end portion of the diode 5 nearer to the component-joint fitting, the end portion of the insulated substrate 10Be nearer to the component-joint fitting, the component-joint fitting, and the nuts 86B. Similarly, regarding the capacitor 4 (not illustrated in FIG. 40) on the insulated substrate 10Be, the resin 134E is also applied to collectively cover the end portion of the capacitor 4 nearer to the component-joint fitting, the end portion of the insulated substrate 10Be nearer to the component-joint fitting, the component-joint fitting, and the nuts 86B. Thus, the outer edge portion of the component-joint fitting and the nuts 86B, which each form an acute angle, are molded by the resin 134E.

Figure 41:
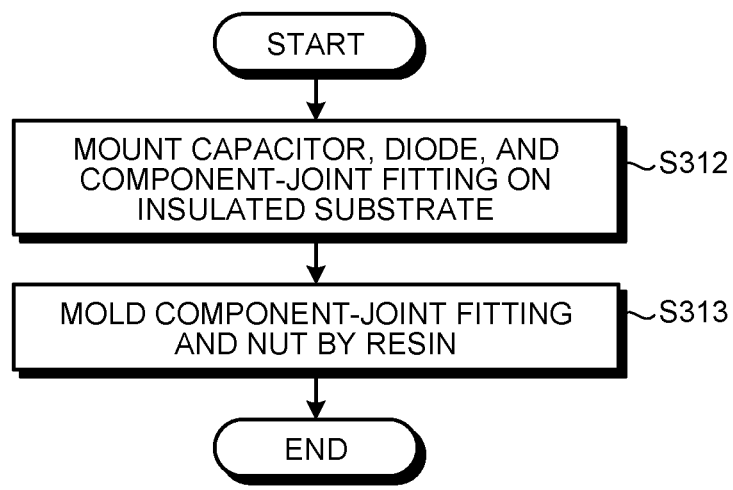
FIG. 41 is a flowchart illustrating a manufacturing procedure for manufacturing the voltage generation device according to the sixth embodiment using the dielectric in the second example.

FIG. 41 is a flowchart illustrating a manufacturing procedure for manufacturing the voltage generation device according to the sixth embodiment using the dielectric in the second example. A method for forming a resin 134E will next be described.

To form a resin 134E collectively over the outer edge portion of the component-joint fitting and over the nuts 86B, the capacitor 4, the diode 5, and the component-joint fittings are mounted on the insulated substrate 10 (step S312).

Specifically, the bolts 85B are penetrated through corresponding ones of the bolt through holes 87 formed in the insulated substrate 10 and through the bolt through holes 84B formed in the bottom portion 82, and tightening the nuts 86B on the bolts 85B from below the insulated substrate 10 causes the capacitor 4, the diode 5, and the component-joint fittings to be electrically connected to one another.

The component-joint fitting and the nuts 86B are then molded together by the resin 134E (step S313).

Examples of the material used for molding include silicon, epoxies, and polyamides and polyesters that are hot-melt adhesives. One molding method is, for example, a hot-melt process, which is low-pressure molding causing insignificant or no damage to the insulated substrate 10 or to a component, and allows use of an aluminum mold. In a hot-melt process, the capacitor 4, the diode 5, and the component-joint fittings are mounted on the insulated substrate 10, and are then molded.

Note that the molding method described with reference to FIGS. 40 and 41 has been provided merely by way of example, and the molding method is not limited to this example. Various molding methods are applicable in terms of the material, the mold, and the forming method. That is, the process of molding together the component-joint fitting and the nuts 86B by the resin 134E has the purpose of covering the high electric field portions with a dielectric such as the resin 134E; application of any molding condition can reduce the electric field.

Thus, in the sixth embodiment, the component-joint fitting and the nuts 86B are covered with either the resin 134D or 134E. This can reduce the electric field in and around the component-joint fitting and the nuts 86B. Thus, it is possible to improve the dielectric strength along the creepage direction for the component-joint fitting and for the nuts 86B.

The configurations described in the foregoing embodiments are merely examples. These configurations may be combined with a known other technology, and configurations of different embodiments may be combined together. Moreover, part of the configurations may be omitted and/or modified without departing from the spirit thereof.

REFERENCE SIGNS LIST

1 CW circuit; 2 inverter circuit; 3A, 3B boosting transformer; 4 capacitor; 5, D101-D113, D201-D213, Da1, Da2, Db1-Db4 diode; 6 support rod; 7 bottom plate; 9A, 9B lead; 10, 10A-10C, 10X insulated substrate; 10a outer edge portion; 11 input portion; 12 output portion; 13 end output point; 16 electrically-conductive pattern; 17 slit; 18 slit end portion; 19 electrode; 20 dielectric layer; 21x, 21y air layer; 22 component connection portion; 27 segmenting area; 30 surrounding container; 31A-31C, 31X stage; 41 solder; 50 rectification circuit portion; 51X, 51Y interconnection wire; 60 voltage-doubling boost circuit portion; 61-64 junction point; 70 insulation plate; 71 spacer; 72, 76-78, 85A, 85B bolt; 73 fixing rod; 74, 75 bolt hole; 80 L-shaped joint fitting; 81 U-shaped joint fitting; 82 bottom portion; 83, 83A back portion; 83B front portion; 84A, 84B, 87 bolt through hole; 86A, 86B nut; 100 voltage generation device; 120 through-hole; 131A-131D high-voltage portion; 132 lead-forming portion; 133 end portion; 134A-134E resin; C01-C07, Ca, Cb1 DC capacitor; C11-C16, C21-C26, Cb2, Cb3 AC capacitor; E1, E2 AC power supply; T1-T3 input terminal.

The invention claimed is:

1. A boost circuit to boost a voltage using a plurality of capacitors and a plurality of diodes disposed on an insulated substrate, wherein
the insulated substrate is divided into a plurality of separate substrate units,
the boost circuit includes a base insulation plate that serves as a base of the substrate units,
the substrate units are fixed to the base insulation plate, and
at least one of the capacitors or the diodes is disposed between the substrate units to cross an insulation layer between the substrate units.

2. The boost circuit according to claim 1, comprising:
the substrate units are disposed at positions at heights that differ between adjacent ones of the substrate units, from the base insulation plate.

3. The boost circuit according to claim 2, wherein
the base insulation plate is annular in shape having an opening formed in a central area of the base insulation plate as viewed from above the base insulation plate.

4. The boost circuit according to claim 3, wherein
the base insulation plate has a rectangular annular shape having a rectangular-shaped outer peripheral portion and the opening that is rectangular, as viewed from above the base insulation plate.

5. The boost circuit according to claim 3, wherein
the base insulation plate has an outer peripheral portion having an octagonal shape or a rectangular shape with rounded corners, as viewed from above the base insulation plate.

6. The boost circuit according to claim 3, wherein
the base insulation plate has the opening having an octagonal shape, a shape of a rectangle with rounded corners, or an elliptical shape, as viewed from above the base insulation plate.

7. The boost circuit according to claim 1, comprising:
the substrate units are fixed to the base insulation plate with spacers interposed between the substrate units and the base insulation plate, and
the base insulation plate is fixed to a support rod.

8. The boost circuit according to claim 7, wherein
the base insulation plate is annular in shape having an opening formed in a central area of the base insulation plate as viewed from above the base insulation plate.

9. The boost circuit according to claim 8, wherein
the base insulation plate has a rectangular annular shape having a rectangular-shaped outer peripheral portion and the opening that is rectangular, as viewed from above the base insulation plate.

10. The boost circuit according to claim 8, wherein
the base insulation plate has an outer peripheral portion having an octagonal shape or a rectangular shape with rounded corners, as viewed from above the base insulation plate.

11. The boost circuit according to claim 8, wherein
the base insulation plate has the opening having an octagonal shape, a shape of a rectangle with rounded corners, or an elliptical shape, as viewed from above the base insulation plate.

12. The boost circuit according to claim 1, wherein
each of the leads connected to the capacitors and the diodes is bent in a direction toward the substrate units, is penetrated through a through-hole provided in a corresponding one of the substrate units, and is soldered to an electrically-conductive pattern formed around an opening of the through-hole.

13. The boost circuit according to claim 1, wherein
the capacitors and the diodes are fixed to at least one of an L-shaped joint fitting or a U-shaped joint fitting using a bolt or a nut, the L-shaped joint fitting being an electrically-conductive joint fitting having an L shape.

14. The boost circuit according to claim 1, wherein
the capacitors and the diodes are components that form a Cockcroft-Walton circuit.

15. The boost circuit according to claim 1, wherein
the insulation layer is formed of gas, the gas being air, dry air, nitrogen, hydrogen, or sulfur hexafluoride.

16. The boost circuit according to claim 1, wherein
at least one of a first lead-forming portion, a second lead-forming portion, or an end portion of an electrically-conductive pattern is covered with a dielectric, the first lead-forming portion being formed by bending a first lead extending from the capacitors, the second lead-forming portion being formed by bending a second lead extending from the diodes, the electrically-conductive pattern being provided on the substrate units for connecting the first lead or the second lead to the electrically-conductive pattern.

17. The boost circuit according to claim 1, wherein
at least one of an outer edge portion of a first component-joint fitting, an outer edge portion of a second component-joint fitting, or a nut for fixing the first component-joint fitting or the second component-joint fitting to the insulated substrate is covered with a dielectric, the first component-joint fitting being provided on the substrate units for connecting a first lead extending from the capacitors to the first component-joint fitting, the second component-joint fitting being provided on the substrate units for connecting a second lead extending from the diodes to the second component-joint fitting.

18. A voltage generation device comprising:
an inverter circuit to generate an alternating current voltage;
a boosting transformer to boost an output voltage from the inverter circuit; and
the boost circuit to boost an output voltage from the boosting transformer, according to claim 1.

19. A boost circuit to boost a voltage using a plurality of capacitors and a plurality of diodes disposed on an insulated substrate, wherein
the insulated substrate is divided into a plurality of substrate units,
at least one of the capacitors or the diodes is disposed between the substrate units to cross an insulation layer between the substrate units, and
the capacitors and the diodes are fixed to an electrically-conductive component-joint fitting using a bolt or a nut.

20. A boost circuit to boost a voltage using a plurality of capacitors and a plurality of diodes disposed on an insulated substrate, wherein
the insulated substrate is divided into a plurality of separate substrate units,
at least one of the capacitors or the diodes is disposed between the substrate units to cross an insulation layer between the substrate units, and
at least one of a first lead-forming portion, a second lead-forming portion, or an end portion of an electrically-conductive pattern is covered with a dielectric, the first lead-forming portion being formed by bending a first lead extending from the capacitors, the second lead-forming portion being formed by bending a second lead extending from the diodes, the electrically-conductive pattern being provided on the substrate units for connecting the first lead or the second lead to the electrically-conductive pattern.

* * * * *